(12) United States Patent
Riha et al.

(10) Patent No.: US 11,731,342 B2
(45) Date of Patent: Aug. 22, 2023

(54) ADDITIVELY MANUFACTURED STRUCTURE AND METHOD FOR MAKING THE SAME

(71) Applicant: RapidFlight Holdings, LLC, Manassas, VA (US)

(72) Inventors: David Riha, Knoxville, TN (US); Alexis Fiechter, Mesa, AZ (US); Robert Bedsole, Knoxville, TN (US); Charles Hill, Topton, NC (US); Timofei Novikov, Friendsville, TN (US); Kyle Rowe, Knoxville, TN (US)

(73) Assignee: RapidFlight Holdings, LLC, Manassas, VA (US)

( * ) Notice: Subject to any disclaimer, the term of this patent is extended or adjusted under 35 U.S.C. 154(b) by 470 days.

(21) Appl. No.: 16/438,248

(22) Filed: Jun. 11, 2019

(65) Prior Publication Data
US 2019/0322032 A1    Oct. 24, 2019

Related U.S. Application Data

(63) Continuation-in-part of application No. PCT/US2019/028775, filed on Apr. 23, 2019, and a
(Continued)

(51) Int. Cl.
*B29C 64/106* (2017.01)
*B33Y 10/00* (2015.01)
(Continued)

(52) U.S. Cl.
CPC ............ *B29C 64/106* (2017.08); *B29B 11/06* (2013.01); *B29B 13/08* (2013.01); *B29C 64/40* (2017.08);
(Continued)

(58) Field of Classification Search
CPC ....... B29C 64/106; B29C 64/40; B29C 70/68; B33Y 70/10; B33Y 10/00; B33Y 30/00;
(Continued)

(56) References Cited

U.S. PATENT DOCUMENTS

| | | | |
|---|---|---|---|
| 5,593,633 A | 1/1997 | Dull et al. | |
| 5,939,008 A | 8/1999 | Comb et al. | |

(Continued)

FOREIGN PATENT DOCUMENTS

| | | | |
|---|---|---|---|
| CN | WO 106626369 A | 5/2017 | |
| CN | 107097424 A | 8/2017 | |

(Continued)

OTHER PUBLICATIONS

WO, International Search Report & Written Opinion, Application No. PCT/US2019/036603, dated Sep. 3, 2019.
(Continued)

*Primary Examiner* — Philip C Tucker
*Assistant Examiner* — Jimmy R Smith, Jr.
(74) *Attorney, Agent, or Firm* — Polsinelli PC

(57) ABSTRACT

An additively manufactured structure and methods for making and using same. An object can be printed at least partially on an attachment portion. The attachment portion can be bonded to the object upon the printing. The object does not need to be removed from the attachment portion. The need of providing a print surface to allow easy removal of the object is eliminated. The object can be a flat panel and can eliminate the need of printing a large flat layer using additive manufacturing. The attachment portion can be cut prior to the printing, so no trimming needs to be performed after the printing. The attachment portion can be made of a material that has one or more selected properties to expand
(Continued)

functionalities of the object. A secondary operation for attaching the attachment portion to the object after the printing can be eliminated.

24 Claims, 26 Drawing Sheets

Related U.S. Application Data continuation-in-part of application No. 16/392,468, filed on Apr. 23, 2019.

(60) Provisional application No. 62/683,527, filed on Jun. 11, 2018, provisional application No. 62/661,903, filed on Apr. 24, 2018, provisional application No. 62/661,903, filed on Apr. 24, 2018, provisional application No. 62/661,553, filed on Apr. 23, 2018, provisional application No. 62/661,553, filed on Apr. 23, 2018.

(51) Int. Cl.
| | | |
|---|---|---|
| *B29B 11/06* | (2006.01) | |
| *B33Y 70/10* | (2020.01) | |
| *B29B 13/08* | (2006.01) | |
| *B29C 64/40* | (2017.01) | |
| B29K 105/04 | (2006.01) | |
| B33Y 30/00 | (2015.01) | |

(52) U.S. Cl.
CPC .............. *B33Y 10/00* (2014.12); *B33Y 70/10* (2020.01); *B29K 2105/04* (2013.01); *B33Y 30/00* (2014.12)

(58) Field of Classification Search
CPC ......... B33Y 80/00; B29B 11/06; B29B 13/08; B29K 2105/04
See application file for complete search history.

(56) References Cited

U.S. PATENT DOCUMENTS

| | | | |
|---|---|---|---|
| 7,056,567 | B2 | 6/2006 | O'Neill et al. |
| 7,127,309 | B2 | 10/2006 | Dunn et al. |
| 8,994,592 | B2 | 3/2015 | Scott et al. |
| 9,399,320 | B2 | 7/2016 | Johnson et al. |
| 9,815,268 | B2 | 11/2017 | Mark et al. |
| 10,286,599 | B2 | 5/2019 | Jones |
| 10,322,530 | B2 | 6/2019 | Kawabe |
| 10,369,742 | B2 | 8/2019 | Scribner et al. |
| 10,442,003 | B2 | 10/2019 | Symeonidis et al. |
| 10,967,576 | B2 | 4/2021 | Fiechter et al. |
| 2005/0208168 | A1 | 9/2005 | Hickerson et al. |
| 2011/0241947 | A1 | 10/2011 | Scott et al. |
| 2012/0115379 | A1 | 5/2012 | Kim |
| 2012/0323345 | A1 | 12/2012 | Jonas et al. |
| 2014/0333011 | A1 | 11/2014 | Javidan et al. |
| 2015/0024169 | A1 | 1/2015 | Martin |
| 2015/0061170 | A1 | 3/2015 | Engel et al. |
| 2015/0291921 | A1 | 10/2015 | Rives |
| 2016/0039194 | A1 | 2/2016 | Cable |
| 2016/0136895 | A1 | 5/2016 | Beyer et al. |
| 2016/0176118 | A1 | 6/2016 | Reese et al. |
| 2016/0185041 | A1* | 6/2016 | Lisagor ................... B29C 70/78 264/257 |
| 2016/0193791 | A1 | 7/2016 | Swanson et al. |
| 2016/0207263 | A1 | 7/2016 | Gordon |
| 2016/0221261 | A1 | 8/2016 | Yamamoto et al. |
| 2016/0332382 | A1 | 11/2016 | Coward et al. |
| 2016/0332387 | A1 | 11/2016 | Jondal et al. |
| 2017/0036403 | A1 | 2/2017 | Ruff et al. |
| 2017/0037674 | A1 | 2/2017 | Hooper et al. |
| 2017/0073280 | A1 | 3/2017 | Jones |
| 2017/0144242 | A1 | 5/2017 | McQueen et al. |
| 2017/0182562 | A1 | 6/2017 | Das et al. |
| 2017/0182712 | A1 | 6/2017 | Scribner et al. |
| 2017/0217105 | A1 | 8/2017 | Taniuchi |
| 2017/0252980 | A1 | 9/2017 | Kelley et al. |
| 2017/0297320 | A1 | 10/2017 | Swanson |
| 2017/0305034 | A1* | 10/2017 | Grivetti .................. B28B 1/001 |
| 2017/0312986 | A1 | 11/2017 | Qian |
| 2018/0009172 | A1 | 1/2018 | Amba et al. |
| 2018/0099452 | A1 | 4/2018 | Ochi et al. |
| 2018/0117833 | A1 | 5/2018 | Nagahari et al. |
| 2018/0154441 | A1 | 6/2018 | Miller et al. |
| 2018/0182532 | A1 | 6/2018 | Stahr et al. |
| 2018/0207863 | A1* | 7/2018 | Porter ................... B29C 64/241 |
| 2018/0311891 | A1 | 11/2018 | Duty et al. |
| 2019/0047221 | A1 | 2/2019 | Baltes |
| 2019/0077081 | A1* | 3/2019 | Susnjara ............... B29C 64/236 |
| 2019/0224909 | A1 | 7/2019 | Riha et al. |
| 2019/0240934 | A1 | 8/2019 | Prins et al. |
| 2020/0024414 | A1 | 1/2020 | Ichino et al. |
| 2021/0039315 | A1 | 2/2021 | Ciscon et al. |

FOREIGN PATENT DOCUMENTS

| | | |
|---|---|---|
| CN | 206884186 U | 1/2018 |
| EP | 3238865 A1 | 11/2017 |
| FR | 2998209 A1 | 5/2014 |
| JP | 2012024920 A | 2/2012 |
| JP | 2018062062 B2 | 4/2015 |
| JP | 2015131469 A | 7/2015 |
| JP | WO2015/049834 A1 | 8/2016 |
| JP | 2017171958 A | 9/2017 |
| JP | WO2017/159349 | 9/2017 |
| JP | 2018/062062 A | 4/2018 |
| KR | 10-2016-0128657 A | 11/2016 |
| KR | 10-2017-0004469 | 1/2017 |
| WO | WO 99/37454 A1 | 7/1999 |
| WO | WO 2013/136096 A1 | 9/2013 |
| WO | 2016136166 A1 | 9/2016 |
| WO | WO 2017/049155 A1 | 3/2017 |
| WO | 2017078168 A1 | 5/2017 |
| WO | 2017106965 A1 | 6/2017 |
| WO | 2017180958 A2 | 10/2017 |
| WO | WO 2017/172574 A1 | 10/2017 |

OTHER PUBLICATIONS

WO, International Search Report & Written Opinion, Application No. PCT/US2019/028775, dated Jan. 17, 2020.
KR, Office Action, Application No. 10-2020-7034143, dated Oct. 26, 2021.
KR, Office Action, Application No. 10-2020-7027227, dated Jun. 24, 2021.
International Search Report and Written Opinion, dated Feb. 18, 2019 for PCT/US2018/060127 (15 pgs ).
International Search Report and Written Opinion, dated Nov. 8, 2019, for PCT/US2019/046191 (13 pages).
Chinese language 2nd Office Action dated Aug. 12, 2022 for CN 20198009811.7 (6 pages).
Japanese-language Office Action, and English-language translation, for JP patent application 2020-261590 dated Dec. 8, 2021 (9 pages).
Chinese language 2nd Office Action dated Jan. 5, 2022 for CN 201980014512.4 (3 pages).
Chinese language 1st Office Action dated Jun. 25, 2021 for CN 201980014512.4 (10 pages).
Canadian Examiner's Report dated Feb. 16, 2022 for CA patent application No. CA3100846 (4 pages).
Chinese language 1st Office Action and Search Report dated Feb. 8, 2022 for CN 201980038575.3 (7 pages).
Korean language Decision of First Refusal, with English language translation, dated Apr. 27, 2022 for 10-2020-7034143 (7 pages).
Chinese language 1st Office Action dated Nov. 17, 2021 for CN 20198009811.7 (8 pgs ).
International Search Report and Written Opinion, dated Jul. 31, 2019, for PCT/US2019/018806 (11 pgs.).

(56) References Cited

OTHER PUBLICATIONS

International Search Report and Written Opinion for PCT/US2019/046191 dated Nov. 8, 2019 (13 pages).
Chinese language 1st Office Action dated Nov. 21, 2021 for CN 201980027421 4 (11 pages).
Bales et al., "Design and Use of a Penetrating Deposition Nozzle for Z-Pinning Additive Manufacturing," Oak Ridge National Lab. (ORNL), Oak Ridge, TN (United States), 2022 (20 pages).
Chinese language 2nd Office Action, with English language translation, dated Dec. 1, 2022 for CN patent application No. CN 201980038575.3 (8 pages).
Chinese language 2nd Office Action, with English language translation, dated Dec. 1, 2022 for CN patent application No. CN 201980027421.4 (15 pages).

* cited by examiner

ADDITIVELY MANUFACTURED STRUCTURE AND METHOD FOR MAKING THE SAME

CROSS-REFERENCE TO RELATED APPLICATIONS

This application claims priority to U.S. provisional patent application, Ser. No. 62/683,527, filed on Jun. 11, 2018. This application is a continuation-in-part of co-pending U.S. patent application Ser. No. 16/392,468, filed on Apr. 23, 2019, which claim priority to U.S. provisional patent application, Ser. No. 62/661,553, filed on Apr. 23, 2018 and United States provisional patent application, Ser. No. 62/661,903, filed on Apr. 24, 2018. This application is a continuation-in-part of co-pending Patent Cooperation Treaty (PCT) patent application PCT/US2019/028775, filed on Apr. 23, 2019, which claims priority to United States provisional patent application, Ser. No. 62/661,553, filed on Apr. 23, 2018 and U.S. provisional patent application, Ser. No. 62/661,903, filed on Apr. 24, 2018. Priority to the provisional and non-provisional patent applications is expressly claimed, and the disclosure of the provisional and non-provisional patent applications is hereby incorporated herein by reference in its entirety and for all purposes.

FIELD

The disclosed embodiments relate generally to additive manufacturing and more particularly, but not exclusively, to additively manufactured structures and methods for making the same.

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the first three-dimensional (3D) printed articles were generally models, the industry is quickly advancing by creating 3D printed articles that may be functional parts in more complex systems, such as hinges, tools, structural elements.

In typical additive manufacturing processes, a 3D object is created by forming layers of material under computer control. An arising challenge for more advanced 3D printed articles is providing a print surface to print on. For example, in 3D printing process based on extrusion deposition, the print surface needs to provide proper adhesion such that the print surface can adhere strongly enough to the printed 3D object to prevent the 3D object from moving throughout the duration of printing. Furthermore, the print surface should typically allow separation from the 3D object without damaging or contaminating the 3D object. Existing print surfaces are often difficult and time-consuming to remove from the 3D object. Upon removal, remaining texture on the 3D object is not always desirable. In addition, when a different material needs to be incorporated with the 3D object, a secondary operation (e.g., bonding or fastening a second material to the 3D object) is required. Often, the secondary operation requires additional pre-processing (e.g., cleaning, abrading, and/or priming) before adhesives or fasteners can be applied) that can be time-consuming, introduce additional errors from manual processes, and present challenges for accessing the 3D object during manufacture.

Additive manufacturing for making a 3D article on a large scale (i.e., typically with at least one dimension greater than 5 feet) can be referred to as large-scale additive manufacturing. A system (or technique) for large scale additive manufacturing can be referred to as large scale additive manufacturing system (or technique). Exemplary large scale additive manufacturing systems include, for example, the Big Area Additive Manufacturing (BAAM) 100 ALPHA available from Cincinnati Incorporated located in Harrison, Ohio, or the Large Scale Additive Manufacturing (LSAM) machine available from Thermwood Corporation located in Dale, Ind. Exemplary systems that use extrusion deposition for large scale additive manufacturing include the BAAM 100 ALPHA and the LSAM machine.

Large-scale additive manufacturing has recently become an area of greater research, use, and technology advancement because of improvements in material properties and increased needs of customized large structures. For example, Local Motors located in Phoenix, Ariz. was the first to use large-scale additive manufacturing, or large-scale extrusion deposition, to print a vehicle. However, large-scale additive manufacturing also faces unique challenges.

Methods for making structures in smaller-scale additive manufacturing may not necessarily apply to large-scale additive manufacturing. Although smaller-scale additive manufacturing may encounter the difficulty of setting up a suitable print surface, the difficulty can be especially severe and present unique challenges in large-scale additive manufacturing. For example, in small-scale additive manufacturing, the print surface can be coated with glue-stick or painter's tape, which coating can be time-consuming and impractical on the large-scale. Furthermore, in a large-scale extrusion deposition process, solidification of the bead can take a long time. Therefore, each printed layer can have respective solidification progress. In addition, the size of the printed layers is large, so the amount of relative deformation between adjacent layers is large. Stress built up between the adjacent layers can be significant.

In some conventional large-scale systems, an acrylonitrile butadiene styrene (ABS) sheet can be used to cover the print bed, be pulled by a vacuum applied via the print bed and provide a high adhesion. However, the print bed can be hot when being heated, making it difficult to place the ABS sheet down or walk on during large-scale additive manufacturing. The ABS sheet can leave uneven gaps on large prints because multiple ABS sheets have to be taped side to side to cover the print bed of a large size. Furthermore, the ABS sheets can be deformed under high stress during printing. As a further challenge, there can be gaps between multiple ABS sheets that can affect print quality. The unevenness of the gaps and presence of gaps between sheets can thus significantly affect quality of printing.

In the event of deformation, the ABS sheet is no longer held down by the vacuum, and can lift off from the print bed. For example, in a large-scale extrusion deposition process, solidification of the bead can take a long time. Therefore, each printed layer can have respective solidification progress. In addition, size of the printed layers are large, so amount of relative deformation between adjacent layers are large. Stress built up between the adjacent layers can be significant. The lift-off of the ABS sheet can result in stress relief in an abrupt manner. The object with such a deformation can appear poorly shaped. Certain deformation of the object can reduce distance between the object and the print head during printing, and width of a bead subsequently deposited on the object can be increased, resulting in print defects.

In some conventional large-scale systems, a board, such as a wood particle board, can be coated with glue and used, such as wood glue. Plastic pellets can be spread over the wood glue. The roughness introduced by the pellets can help to hold the object in place during printing. However, in large-scale additive manufacturing, spreading the pellets over the board can be time consuming—and difficult to evenly distribute the glue and pellets during manufacturing. Uneven distribution of either can result in non-uniform adhesion of the object, which can cause deformation of the object. When the object is removed from the board, large amounts of slippery pellets can fall to the ground, resulting in a large mess. Furthermore, the board cannot be easily reused due to the lost pellets. Finally, this method results in pellets stuck to the bottom layer of the print, reducing the quality and flatness of this layer; typically, this bottom layer will need to be removed with a secondary operation.

Another challenge is printing of large flat surfaces. For example, in a large-scale extrusion deposition process, time between printing of two adjacent layers can be long. Of the two adjacent layers, the first layer can solidify to a great extent before the second layer is printed. Adhesion between the two layers can thus be poor. Additionally, it can be difficult to achieve good overlap in the y-direction when printing large flat surfaces. Over-filling after only a few adjacent layers can lead to compounding errors for the print head to potentially crash into. Over-filling can also cause the tamper (BAAM) or roller (LSAM) to jam and stop working. On the other hand, under-filling can yield poor mechanics.

Another arising challenge for more advanced 3D printed articles is printing overhang structures. For example, many structural materials have poor ability to bridge a gap without deformation (e.g., drooping) or breaking under gravity. An overhang structure can include a portion of a printed structure that extends from a main part of the printed structure and into empty space in a direction at least partially orthogonal to gravity. A bridge structure can include an exemplary overhang structure having two opposing end regions each connected to a printed structure.

Although smaller-scale additive manufacturing may encounter the difficulty of making overhang structures, the difficulty is especially severe and presents unique challenges in large-scale additive manufacturing. In a large-scale extrusion deposition process, the overhang structure is usually of large scale. The amount of deformation of the overhang structure can be significant. For example, in a large-scale extrusion deposition process, an extruded bead at large scale can hold heat much longer and remain in a rubbery or molten state long after the nozzle has attempted to deposit the bead in a desired location. During solidification of the bead, the bead may not be able to maintain dimension under the weight of the bead itself and under the weight of material printed on top of the bead. Although a rapid solidification process may be used to speed up the solidification, such as spraying the bead with liquid nitrogen, the rapid solidification process can significantly reduce inter-laminar adhesion between printed layers and weaken strength of the large-scale printed structure. In contrast, in a small-scale extrusion deposition process, fans can be used to rapidly solidify material as it leaves the nozzle and overhangs can be printed more easily.

To aid in the printing of overhang structures, support structures can be printed concurrently with the object, and then the overhang structure can be subsequently printed on the support structure. However, in large-scale additive manufacturing, such a support structure costs significant resources such as material, print time, and energy consumption. Furthermore, properties of the support structure cannot be selected with flexibility, so removal of the support structure can be difficult. Even if a sparse infill pattern is used to print the support structure, it can still be difficult to remove, and the problems discussed above for printing across the gaps in a sparse infill support structure still exist.

In view of the foregoing, there is a need for improvements and/or alternative or additional solutions to improve additive manufacturing processes to produce print surfaces that overcome drawbacks of existing solutions and minimize the number of secondary operations.

Figure 1:
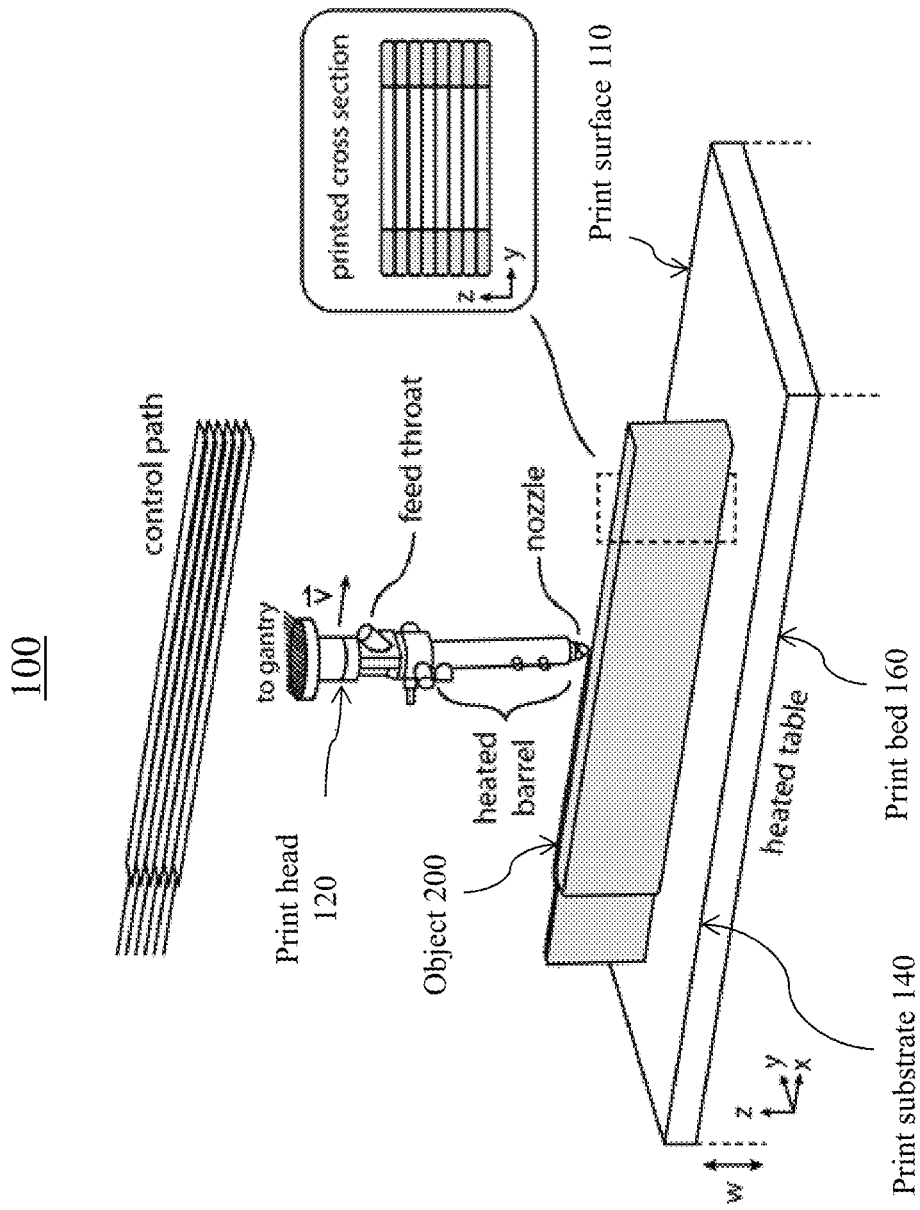
FIG. 1 is an exemplary diagram illustrating an embodiment of a system for additive manufacturing.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

FIG. 1 shows an exemplary system 100 for additive manufacturing. The system 100 can include a 3D printer configured to print an object 200 via extrusion deposition (or material extrusion). A print head 120 is shown as including a nozzle configured to deposit one or more polymer layers onto a print substrate 140 to form the object 200. The print substrate 140 is shown in FIG. 1 as providing a print surface 110 for receiving initial printed material deposited from the print head 120.

The print substrate 140 is shown as including a print bed 160. The print bed 160 can provide a uniform or flat surface. The print bed 160 can include a heated and/or unheated table. The print substrate 140 can include any alternative type of print bed and any other intermediate structures (not shown) that at least partially covers the print bed. The stacking direction of the layers is z-direction and the printing direction is the x-direction.

Although FIG. 1 shows additive manufacturing as being implemented by the system 100 using extrusion deposition, any other systems or processes for implementing additive manufacturing can be used in the present disclosure. Exemplary processes for additive manufacturing can include binder jetting, directed energy deposition, material jetting, powder bed fusion, sheet lamination, vat photopolymerization, stereolithography, or a combination thereof.

As discussed above, typically it is desirable to remove the object 200 from the print surface 110. Accordingly, the system 100 for additive manufacturing provides a suitable bond between the print surface 110 and the initially printed layers to prevent damage or contamination to the object 200 and/or provide a temporary bond for subsequent attachment via fasteners and/or pins.

Furthermore, since currently-available methods and systems are incapable of providing a reliable print surface with appropriate adhesion, producing large flat surfaces with good interlayer adhesion, and generating large-scale additively manufactured parts with strong overhang structures, additively manufactured structures and method for making the same that can overcome the drawbacks as set forth above can prove desirable and provide a basis for a wide range of applications, such as additive manufacturing for vehicles and/or architectural structures.

Although the structures and methods as set forth in the present disclosure are applied to solve technical problems in large-scale additive manufacturing, the structures and methods can be applied to any smaller-scale additive manufacturing, such as medium-scale and/or small-scale additive manufacturing, without limitation. For example, in some embodiments, due to machine size, large-scale additive manufacturing provides easy access (e.g., parts are larger, more room to work in the machine while printing) to carry out the embodiments disclosed herein. However, those of ordinary skill in the art would understand that the embodiments disclosed herein can be applied to smaller-scale additive manufacturing systems.

Figure 2A:
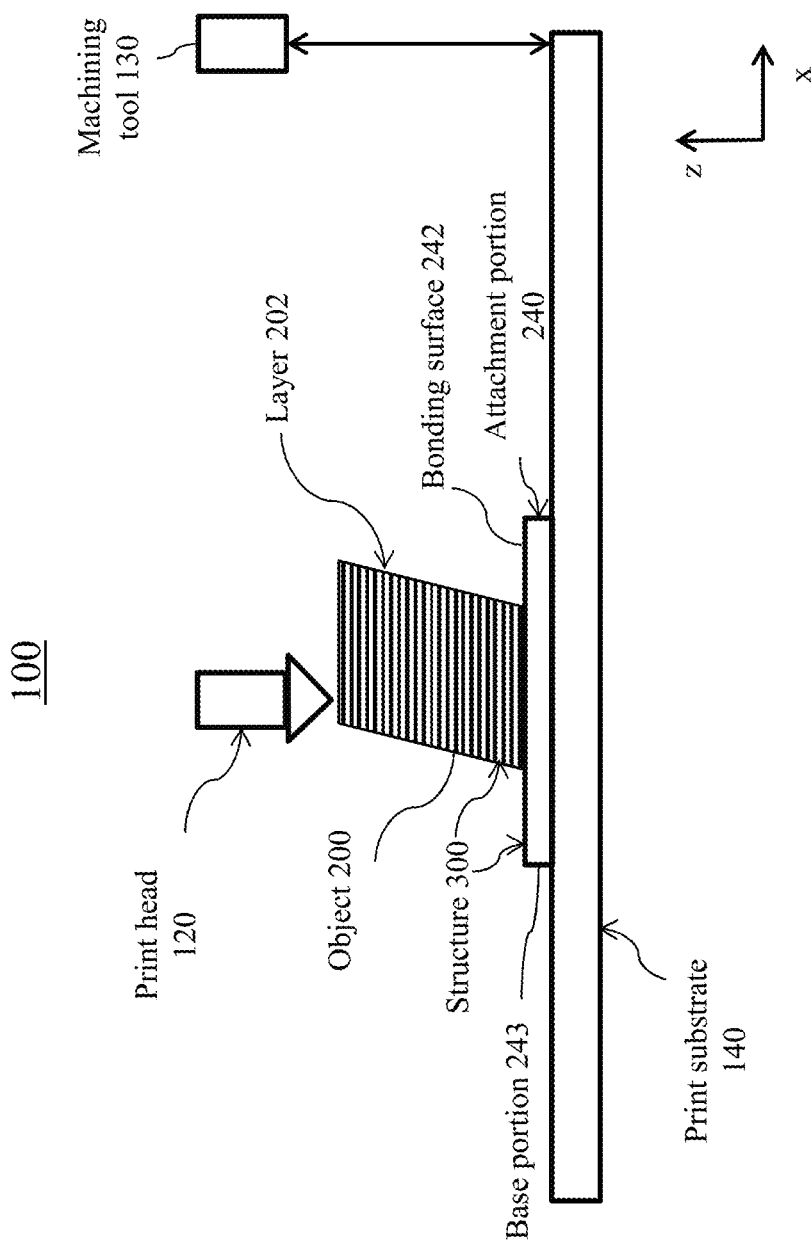
FIG. 2A is an exemplary diagram illustrating an alternative embodiment of the system of FIG. 1, wherein the system makes a structure including an object and an attachment portion.

Turning to FIG. 2A, an alternative embodiment of the exemplary system 100 is shown. An attachment portion 240 is shown as being disposed on the print substrate 140. The attachment portion 240 can be permeable and/or non-permeable. The attachment portion 240 is shown in FIG. 2A as having the shape of a flat panel. An exemplary attachment portion 240 can be made by cutting a sheet material via stamping, milling, die cutting, forming, casting, laser cutting and/or water jet cutting, additive manufacturing, or a combination thereof. In one embodiment, the attachment portion 240 can be pre-cut into a selected shape and size prior to being positioned in the system 100. Advantageously, the attachment portion 240 can replace large flat sections of the object 200 that might otherwise be printed. In some embodiments, the attachment portion 240 comprises one or more layers 202 of the object 200. Additionally and/or alternatively, an exemplary attachment portion 240 can be made using additive manufacturing.

The object 200 and the attachment portion 240 can be made of uniform and/or different materials. In one embodiment, the object 200 can be made of a first material and the attachment portion 240 can be made of a second material that is different from the first material. By way of example, and as further discussed below, the object 200 can comprise printed carbon fiber filled ABS being printed on the attachment portion 240 that comprises a polycarbonate honeycomb sheet and/or ABS honeycomb sheet. In another example, the object 200 can comprise a foamed polymer (e.g., PES) that can be bonded to a plate or structure as the attachment portion 240, such that a print on top of the object 200 can affix the polymer to the plate or structure. In yet another example, a closed loop can be printed for several layers before pausing to fill it with a two-part spray foam. After a short time (e.g., 30 seconds), the expanded foam can be cut to be even with the top printed layer and serve as a print surface. Additionally and/or alternatively, the object 200 can be made of polyethylene terephthalate (PET), polyethylene terephthalate glycol (PETG), and/or the like.

The attachment portion 240 can be positioned on the print substrate 140 prior to (or during the) printing of the object 200. The attachment portion 240 can be fixed in position relative to the print substrate 140 in any suitable manner including, for example, vacuum, taping, clamping, bolting, and/or applying an adhesive (removable and/or permanent). Additionally and/or alternatively, the attachment portion 240 can be fixed in position relative to the print substrate 140 via a mechanical connection such as a cooperating detent including any combination of mating elements, such as blocks, tabs, pockets, slots, ramps, locking pins, cantilevered members, support pins, and the like, that may be selectively or automatically engaged and/or disengaged to couple or decouple the attachment portion 240 and the print substrate 140 relative to one another.

The object 200 is shown as including one or more layers 202 being stacked in the z-direction. The object 200 can be manufactured using additive manufacturing. The print head 120 can print the object 200 at least partially on the attachment portion 240. An exemplary object 200 can be made of a thermoplastic material including ABS, polycarbonate, polyamide, poly(p-phenylene oxide) (PPO), poly(p-phenylene ether) (PPE), or a combination thereof. The object 200 can also be filled with carbon and/or glass when printed on the large-scale to limit warpage, improve flow, and/or affect mechanics.

In one embodiment, the object 200 can be at least partially made of thermoplastic polyurethane (TPU). Exemplary TPU can include an ester-based TPU. In an unlimiting example, the ester-based TPU can have a Shore hardness ranging from 85A to 98A. The TPU can be 3D printed with the print bed 160 (shown in FIG. 1) kept at room temperature. Advantageously, because higher operating temperatures place strain on the print bed 160, keeping the print bed 160 at room temperature can extend the life time of the print bed 160 and ease print bed-related procedures performed by an operator. Additionally and/or alternatively, the TPU can be recyclable and result in less environmental waste.

Upon being in contact with the object 200 during printing, the attachment portion 240 can be bonded to the object 200. Optionally, the attachment portion 240 can be bonded to the object 200 at optimal strength after being in contact with initially-printed layers 202 of the object 200 for a selected amount of time. In other words, the attachment portion 240 can be bonded to the object 200 at optimal strength after the initially-printed layers 202 of the object 200 are cooled or solidified for a selected amount of time. Stated somewhat differently, the object 200 can adhere to the attachment portion 240 upon being in contact with a bonding surface 242 of the attachment portion 240. The bonding surface 242 can be a surface on the attachment portion 240 proximal to the object 200. A structure 300 can thus be formed. The structure 300 can include the object 200 and the attachment portion 240. Stated somewhat differently, upon completion of printing the object 200, the structure 300 can be removed from the print substrate 140 as a whole, with the attachment portion 240 remaining adhered to the object 200. In one embodiment, the attachment portion 240 can be permanently bonded to the object 200.

In one embodiment, the attachment portion 240 can bond with the object 200 upon contacting with the object 200 and/or upon being heated. For example, the attachment portion 240 can absorb heat from the object 200 during printing and/or absorb heat from the print substrate 140, for example, when the print substrate 140 includes a heated table. In some embodiments, the attachment portion 240 can be further secured to the object 200 using additional fasteners and/or attachments (not shown), for example, as a secondary operation.

FIG. 2A shows the attachment portion 240 that includes a base portion 243. The base portion 243 can be a solid part of the attachment portion 240 and is shown as being in contact with the object 200. An exemplary base portion 243 can be made of any material including metal, polymer, ceramic, semiconductor, or a combination thereof. An exemplary base portion 243 can be made of a thermoplastic and/or thermoset material. Exemplary base portion 243 can be made of polyetherimide (PEI), polyethersulfone (PES), PET, PETG, ABS, polycarbonate, polyamide, PPO, PPE, TPU, or a combination thereof. Upon being heated, the base portion 243 can melt and bond with the object 200. Optionally, the base portion 243 can have a smooth texture, foam texture, closed cell foam texture, open cell foam texture, corrugation texture, randomly roughened texture, patterned texture (e.g., dimples, pips, geometric, and so on), and/or honeycomb texture. For example, the base portion 243 can include PEI foam and/or PES foam. In another example, the base portion 243 can include cardboard and/or a surface that is roughened for printing.

In one embodiment, the base portion 243 can include a thermoplastic and/or thermoset material in the form of a sheet or any other shape. The thermoplastic and/or thermoset material can optionally be fiber-reinforced. For example, a textile can be soaked and/or saturated in a thermoplastic material to form the fiber-reinforced thermoplastic sheet. In another example, the thermoplastic material can be 3D printed and made of, for example, thermoplastic polyurethane (TPU). The textile can be embedded in the TPU during the 3D printing to form fiber-reinforced TPU. The textile can include any flexible material including a network of natural and/or artificial fibres. An exemplary fibre can include yarn or thread. The textile can be formed by any suitable processes including, for example, weaving, knitting, crocheting, knotting, felting, matting, condensing, and/or pressing. The textile can include any organic textile, semi-synthetic textile, synthetic textile, woven textile, non-woven textile, or a combination thereof. Exemplary organic textile can include cotton, denim, canvas, duck canvas, linen, silk, wool, and/or the like. Exemplary semi-synthetic textile can include rayon and/or the like. The exemplary synthetic textile can include polyester, acrylic, polyamide, polymeric microfibers, and/or the like. Additionally and/or alternatively, the thermoplastic and/or thermoset material can be fiber-reinforced with any suitable strengthening fiber, including carbon fiber, glass fiber, and/or the like.

In one embodiment, when the base portion 243 is made of the thermoplastic and/or thermoset material, and when the print substrate 140 is heated, a textured and/or patterned sheet can be positioned between the base portion 243 and the print substrate 140. The texture of the sheet can be imprinted onto the base portion 243.

In some embodiments, the object 200 is not removed from the attachment portion 240, and, therefore, the problem of providing the print surface 110 (shown in FIG. 1) to allow easy removal of the object 200 is advantageously eliminated. The attachment portion 240 can include a flat panel and can advantageously eliminate the need of printing a large flat layer using additive manufacturing.

In addition, when the attachment portion 240 is pre-cut prior to the printing of the object 200, no post-part or post-printing trimming needs to be performed after the printing. Advantageously, processing of the object 200 can be simplified. The attachment portion 240 can be made of a mechanically strong material and thus provides a strong high tension layer on the object 200 that can result in a lighter and stronger structure 300. Furthermore, the attachment portion 240 can function as a shear panel for the printed object 200. By way of example, the attachment portion 240 comprises a closeout panel of a lower chassis of a three-dimensional printed vehicle.

Additionally and/or alternatively, the attachment portion 240 can be made of a material that has one or more selected properties and can advantageously expand functionalities of the structure 300. For example, the attachment portion 240 can be thermally insulative, semiconductive and/or conductive. Additionally and/or alternatively, the attachment portion 240 can be electrically insulative, semiconductive and/or conductive. For example, the attachment portion 240 made of PEI foam and/or PES foam can be thermally insulative. Additionally and/or alternatively, the attachment portion 240 can provide mechanical improvement to the structure 300, and/or provide a chemical barrier and/or a moisture barrier.

Because the attachment portion 240 can be bonded at the same time of printing the object 200, a secondary operation for attaching the attachment portion 240 to the object 200 can be eliminated and/or reduced. Advantageously, time and labor cost can be saved and manufacturing process can be simplified. Additional problems with creating and using/re-using existing removable print surfaces (discussed above) can advantageously be avoided.

The system 100 is shown as including an optional machining tool 130. The machining tool 130 can remove a selected portion of the object 200 and/or the attachment portion 240 during and/or after printing of the object 200. Exemplary machining tool 130 can include a mill, lathe, any type of cutting machine, or a combination thereof. The machining tool 130 can be installed at any suitable location of the system 100. FIG. 2A shows the machining tool 130 as being directly and/or indirectly connected to the print bed 160 for illustrative purposes only. The print head 120 and the machining tool 130 can be controlled by uniform and/or different control systems 500 (shown in FIG. 22).

Although FIG. 2A shows the attachment portion 240 as being a flat panel 240 vertical to the z-direction for illustrative purposes only, the attachment portion 240 can have any selected shapes positioned at any suitable orientations, without limitation.

Figure 2B:
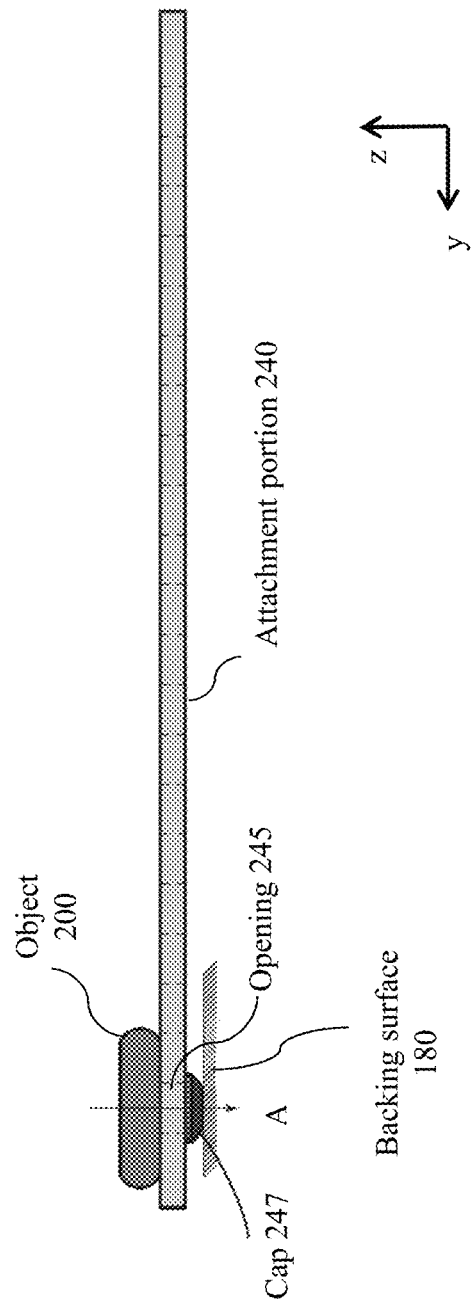
FIG. 2B is an exemplary cross-sectional diagram illustrating an alternative embodiment of the system of FIG. 2A, wherein the attachment portion defines one or more openings.

Turning to FIG. 2B, the attachment portion 240 is shown as having a planar shape and defining a plurality of openings 245 (shown by dashed lines) passing through the attachment portion 240 in the z direction. Stated somewhat differently, the attachment portion 240 can include a perforated panel. The object 200 is shown as being formed via printing a bead on the attachment portion 240. The material of the bead is forced, in molten state, through the opening 245 in a direction A until contacting a backing surface 180. Exemplary backing surface 180 can include the print substrate 140 (shown in FIG. 2A), a previously printed layer 202 (shown in FIG. 2A) and/or any other suitable sheet positioned below the attachment portion 240.

The material that cannot flow beyond the backing surface 180 is forced to spread (or mushroom out) in a direction perpendicular to the direction A and is shown as forming a cap 247. Stated somewhat differently, the object 200 is printed on a first side of the attachment portion 240, and the material of the bead flows across the attachment portion 240 and spreads on a second side of the attachment portion 240 that is opposite to the first side. In a bottom view in the z direction, the size (or area) of the cap 247 can be greater than the size (or area) of the opening 245. The cap 247 can thus form a mechanical interlock that binds the attachment portion 240 to the object 200. Advantageously, the attachment portion 240 can be bonded to the object 200 in a reliable manner even if there is no adhesion or low adhesion between the attachment portion 240 and the object 200.

Figure 2C:
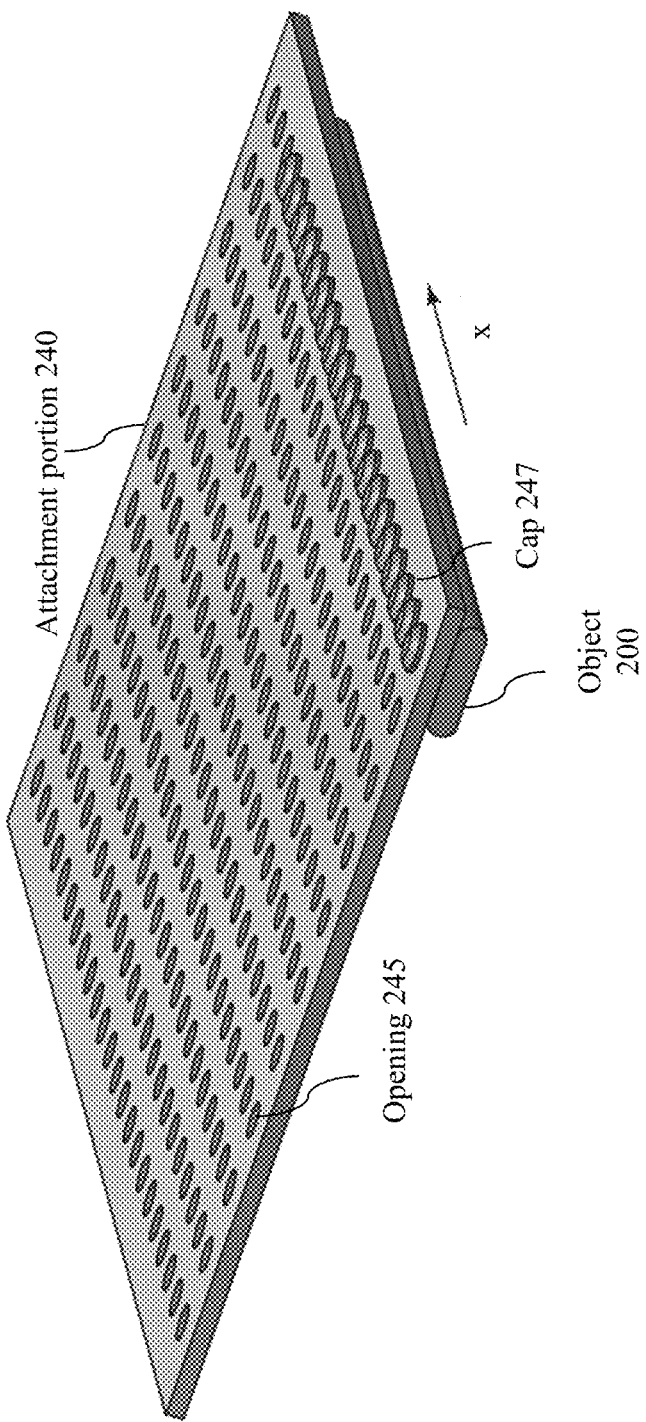
FIG. 2C is an exemplary trimetric diagram illustrating an alternative embodiment of the system of FIG. 2B, wherein the attachment portion defines an array of openings.

Turning to FIG. 2C, the attachment portion 240 is shown as defining an array of openings 245. The bead of the object 200 is shown as being printed along a row of the openings 245 and forming a row of caps 247. When the object 200 is printed to cover more openings 245, more caps 247 can form and strength of mechanical interlocking between the attachment portion 240 and the object 200 can be increased further.

Although FIG. 2C shows the x direction as being aligned (parallel) to a row of the openings 245 for illustrative purposes only, the x direction can be oriented relative to the rows or columns of the openings 245, without limitation. Although FIG. 2C shows an array of openings 245 each having an oval shape for illustrative purposes only, the attachment portion 240 can define any number of openings 245 having uniform and/or different shapes and arranged in any selected patterns.

Figure 3:
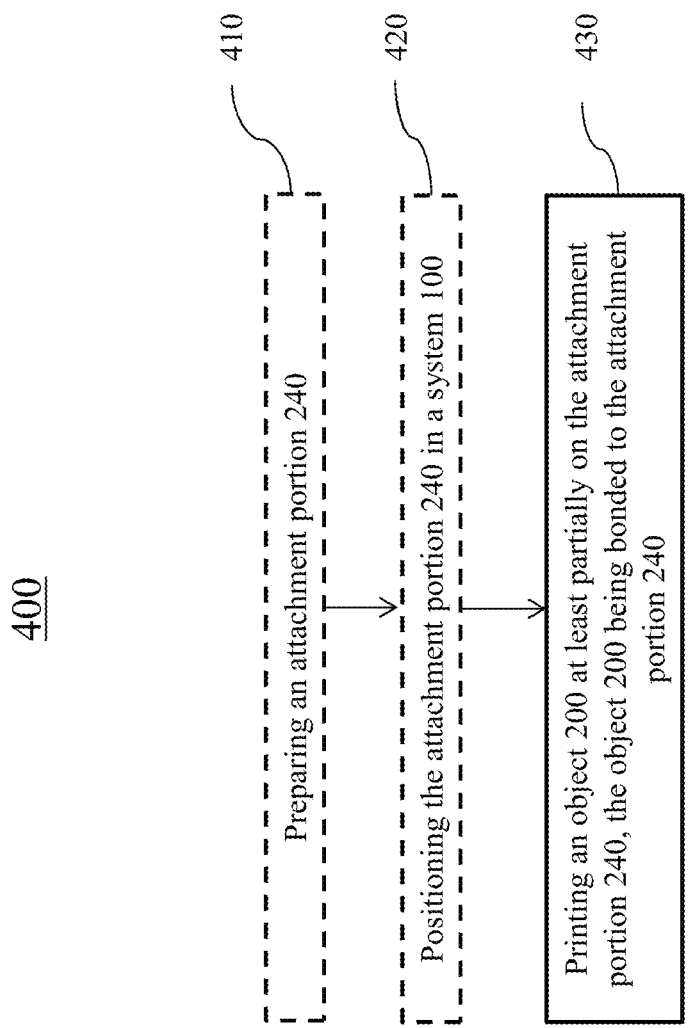
FIG. 3 is an exemplary top-level flow chart illustrating an embodiment of a method for additive manufacturing based on the system of FIG. 2.

Turning to FIG. 3, an exemplary flow chart of an embodiment of a method 400 of making the structure 300 (shown in FIG. 2A) is shown. The attachment portion 240 can be optionally positioned, at 420, in the system 100. For example, the attachment portion 240 can be placed to be at least partially in contact with the print substrate 140. Additionally and/or alternatively, the attachment portion 240 can be placed at a distance from the print substrate 140. Stated somewhat differently, the attachment portion 240 can be placed without contacting the print substrate 140.

The object 200 can be printed, at 430, at least partially on the attachment portion 240. The object 200 can be bonded with the attachment portion 240 upon or after the printing. The bonding between the object 200 and the attachment portion 240 can be of any suitable nature. In one embodiment, the bonding can include chemical and/or physical bonding such as adhesion. Additionally and/or alternatively, the bonding can include mechanical interlocking (shown in FIG. 2B, for example).

Optionally, the attachment portion 240 can be prepared, at 410. Preparing the attachment portion 240 can include one or more processes for treating (or pre-treating the surface of) the attachment portion 240 to allow bonding between the attachment portion 240 and the object 200. In one example, the preparing can include performing a surface pre-treatment to increase roughness of the bonding surface 242 (shown in FIG. 2A). Additionally and/or alternatively, the surface pre-treatment can generate active chemical bonds on the bonding surface 242. Exemplary surface treatment can include plasma treatment, sputtering, etching, ultra-violet ozone treatment, wet etching, chemical wiping, flame treatment, sanding, and/or milling. In one embodiment, the base portion 243 (shown in FIG. 2A) can be made of a material including metal, such as aluminum and/or steel. In one embodiment, the preparing can include a plasma treatment of the base portion 243 to clean, increase the surface energy, and/or roughen the bonding surface 242 for improved bonding.

Although FIG. 3 shows the preparing at 410 and the positioning at 420 as being performed before the printing at 430 for illustrative purposes only, the preparing at 410 and/or the positioning at 420 can be performed before and/or during the printing at 430, without limitation. Optionally, the method 400 can include fastening the attachment portion 240 to the object 200 after the printing at 430. Advantageously, detachment of the attachment portion 240 from the object 200 can be further prevented.

Figure 4A:
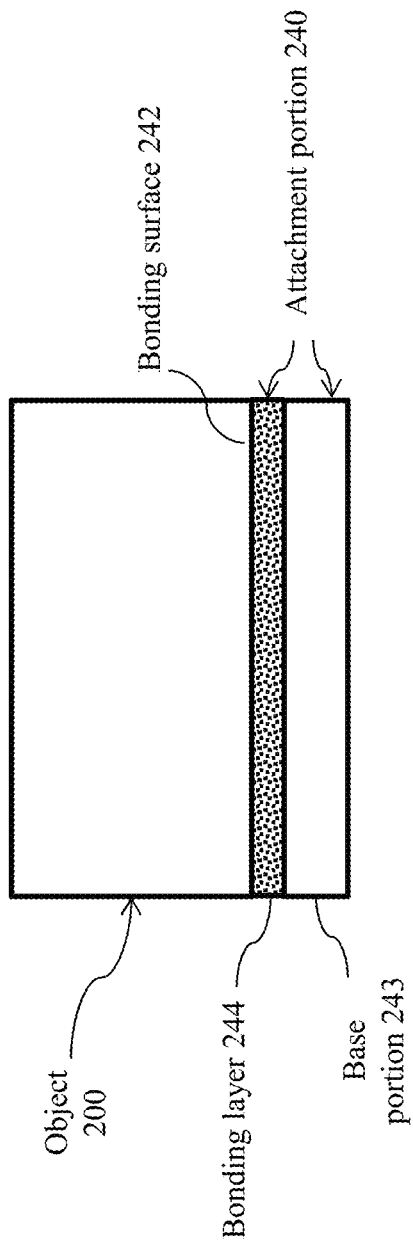
FIG. 4A is an exemplary cross-sectional diagram illustrating an alternative embodiment of the structure of FIG. 2A, wherein the attachment portion includes a bonding layer and a base portion.

Turning to FIG. 4A, the attachment portion 240 is shown as including a bonding layer 244 between the base portion 243 and the object 200. The bonding layer 244 can be disposed on the base portion 243 prior to printing of the object 200 on the attachment portion 240. Stated somewhat differently, preparing the attachment portion 240 can include disposing the bonding layer 244 on the base portion 243, and the bonding surface 242 becomes the interface between the bonding layer 244 and the object 200. The bonding between the bonding layer 244 and the base portion 243 can be of any suitable nature. In one embodiment, the bonding can include chemical and/or physical bonding such as adhesion. Additionally and/or alternatively, the bonding can include mechanical interlocking (shown in FIG. 4B, for example). The bonding layer 244 can bond the attachment portion 240 with the object 200 upon contacting with the object 200 and/or upon being heated. For example, the bonding layer 244 can absorb heat from the object 200 during printing and/or absorb heat from the print substrate 140, for example, when the print substrate 140 includes a heated table.

An exemplary bonding layer 244 can include an adhesive. For example, the adhesive can include wood glue, contact adhesive, thermoplastic and thermoset adhesives such as B-stage epoxy, or a combination thereof. Exemplary adhesives can be resin-based, urethane-based, acrylate-based, butadiene-chloroprene-based, acrylic-based, neoprene-based, poly(vinyl alcohol)-based, or a combination thereof. For example, the adhesive can include any contact adhesive, wood glue, or a combination thereof. Exemplary contact adhesives can include natural rubber and/or polychloroprene (or neoprene). In one example, the contact adhesive can include 3M 3ONF Contact Adhesive (available from 3M Company located in Maplewood, Minn., U.S.), 3M Fastbond Pressure Sensitive Adhesive 4224 NF, Clear (available from 3M Company), 3M Fastbond 30H Contact Adhesive (available from 3M Company), 3M Neoprene contact Adhesive 5, Neutral Sprayable (available from 3M Company). Exemplary wood glue can be poly(vinyl alcohol)-based or PVA-based. Furthermore, the bonding layer 244 can include acrylates, urethanes, epoxies, polyamides, polyimides, and other hot melt adhesives. In one embodiment, adhesives with lower adhesive strength—such as a contact adhesive or wood glue—can be used to temporarily hold the object 200 during printing. In this embodiment, the panel can be pre-fabricated with alignment features. The panel can be advantageously aligned by the printed object and further include alignment features for secondary alignment of fasteners, components, and so on after the object is removed from the print substrate. In some embodiments, this panel can be removed, for example, during vehicle service, by removing screws and peeling away the weakly bonded panel.

In some embodiments, if a selected layer 202 of the object 200 becomes too cold—whether planned or unplanned (e.g., result of a power failure, material feed problem, and so on)—an adhesive can be coated on the cold selected layer 202 before the next layer 202 is printed. Stated somewhat differently, the base portion 243 can include one or more layers 202 previously printed, and the bonding layer 244 can include the adhesive such that newly printed layers 202 can be bonded to the previously-printed layers 202.

Additionally and/or alternatively, the bonding layer 244 can include a thermoplastic and/or thermoset material. Exemplary bonding layer 244 can be made of polyetherimide (PEI), polyethersulfone (PES), polycarbonate, ABS, polycarbonate, polyamide, PETG, PET, PPO, PPE, TPU, or a combination thereof. In one embodiment, the bonding layer 244 can be 3D printed. In that case, exemplary bonding layer 244 can be made of TPU and/or polyamide. In one embodiment, the bonding layer 244 can be at least partially made of polyamide. Exemplary polyamide that can be 3D printed can include Technomelt, available at Henkel AG & Co. KGaA located in Dusseldorf, Germany.

Although FIG. 4A shows the bonding layer 244 is disposed on the entire base portion 243 for illustrative purposes only, the bonding layer 244 can partially and/or entirely cover the base portion 243, without limitation. For example, the bonding layer 244 can be disposed on selected regions on the base portion 243 where the base portion 243 interfaces with the object 200.

The object 200 and the bonding layer 244 can be respectively made of any suitable materials. In one example, a carbon fiber/ABS layer can be printed on unfilled ABS sheets, such that increasing the sheet temperature above a predetermined temperature (e.g., 110° C.) creates a permanent bond. In another example, PETG printed onto PETG sheets can be heated to create a permanent bond. Although described with similar/like materials, different materials can be used that interact favorably with one another with or without heating. By way of example, PETG can be printed onto unfilled ABS sheets (e.g., on the smooth side) at room temperature to create a permanent bond.

Optionally, the bonding layer 244 can have a texture when viewed in the z-direction. Stated somewhat differently, the bonding layer 244 can have a physical roughness to increase grip force that enhances adhesion to the object 200. In one embodiment, the bonding layer 244 can have a honeycomb pattern when viewed in the z-direction. For example, the bonding layer 244 can include a honeycomb patterned (or structured) polycarbonate sheet. In another example, the bonding layer 244 can include PEI foam and/or PES foam having a foam texture. In one embodiment, the bonding layer 244 can be fixed to the base portion 243 in any suitable manner including, for example, by using a selected adhesive.

Figure 4B:
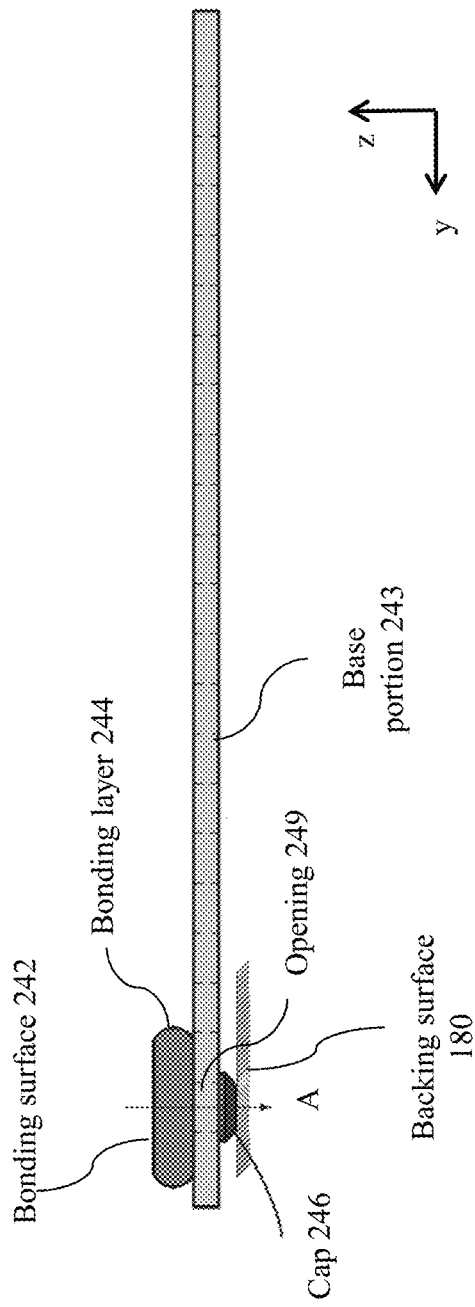
FIG. 4B is an exemplary cross-sectional diagram illustrating an alternative embodiment of the system for making the structure of FIG. 4A, wherein the base portion defines one or more openings.

Turning to FIG. 4B, the base portion 243 is shown as having a planar shape and defining a plurality of openings 249 (shown by dashed lines) passing through the base portion 243 in the z direction. The bonding layer 244 is shown as being formed via printing a bead on the base portion 243. The material of the bead is forced, in molten state, through the opening 249 in the direction A until contacting the backing surface 180.

The material that cannot flow beyond the backing surface 180 can be forced to spread (or mushroom out) in a direction perpendicular to the direction A and is shown as forming a cap 246. In a bottom view in the z direction, the size (or area) of the cap 246 can be greater than the size (or area) of the opening 249. The cap 246 can thus form a mechanical interlock that binds the bonding layer 244 to the base portion 243. Advantageously, the bonding layer 244 can be bonded to base portion 243 in a reliable manner even if there is no adhesion or low adhesion between the bonding layer 244 and the base portion 243.

Figure 4C:
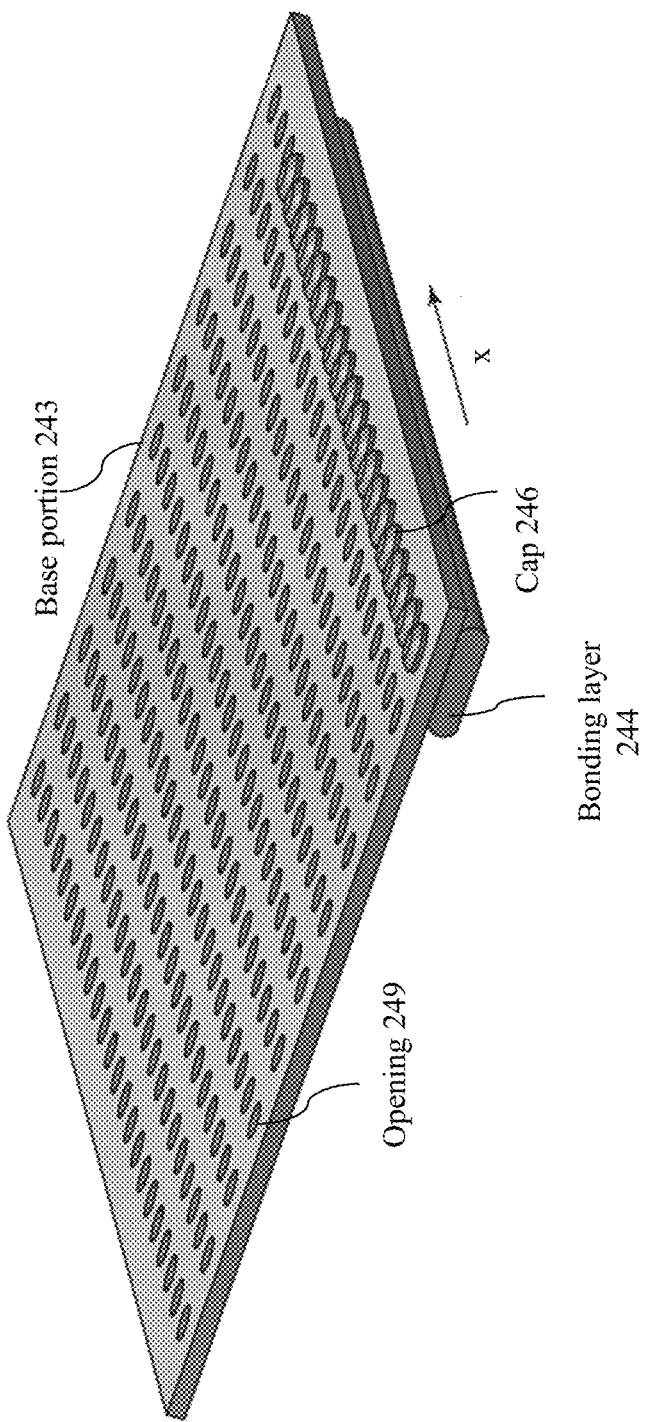
FIG. 4C is an exemplary trimetric diagram illustrating an alternative embodiment of the structure of FIG. 4B, wherein the base portion defines an array of openings.

Turning to FIG. 4C, the base portion 243 is shown as defining an array of openings 249. The bead of the bonding layer 244 is shown as being printed along a row of the openings 249 and forming a row of caps 246. When the bonding layer 244 is printed to cover more openings 249, more caps 246 can form and strength of mechanical interlocking between the bonding layer 244 and the base portion 243 can be increased further.

Although FIG. 4C shows the x direction as being aligned (parallel) to a row of the openings 249 for illustrative purposes only, the x direction can be oriented relative to the rows or columns of the openings 249, without limitation. Although FIG. 4C shows an array of openings 249 each having an oval shape for illustrative purposes only, the base portion 243 can define any number of openings 249 having uniform and/or different shapes and arranged in any selected patterns, without limitation.

Figure 5:
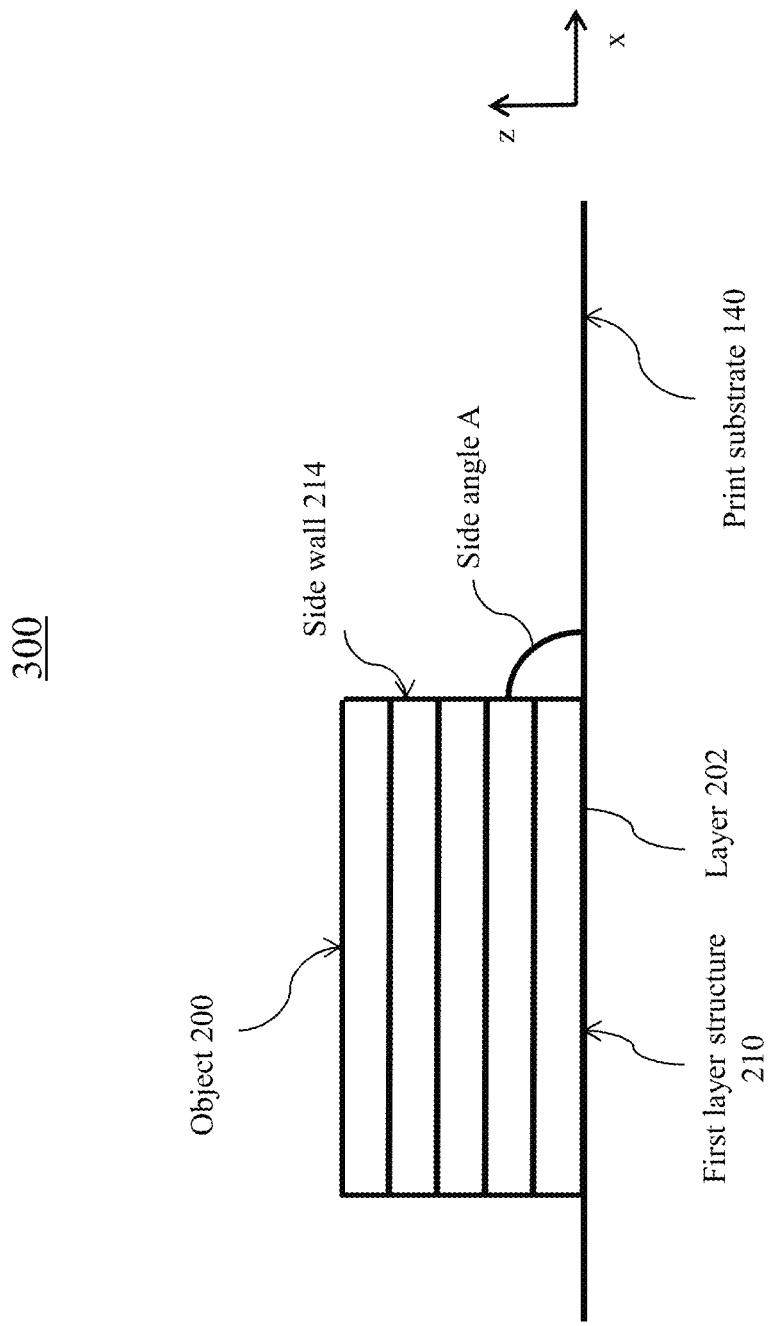
FIG. 5 is an exemplary cross-sectional diagram illustrating an alternative embodiment of the structure of FIG. 2A during manufacturing, wherein the object includes a first layer structure.

Turning to FIG. 5, a cross section of the structure 300 is shown. Of the structure 300, the object 200 is shown as including a first layer structure 210. The first layer structure 210 is shown as including one or more layers 202 being stacked in the z-direction. The first layer structure 210 can be manufactured using additive manufacturing.

The first layer structure 210 is shown as having a sidewall 214. The sidewall 214 is shown as being at a side angle A relative to the x-direction. Stated somewhat differently, the sidewall 214 is at the side angle A relative to the print substrate 140.

Figure 6:
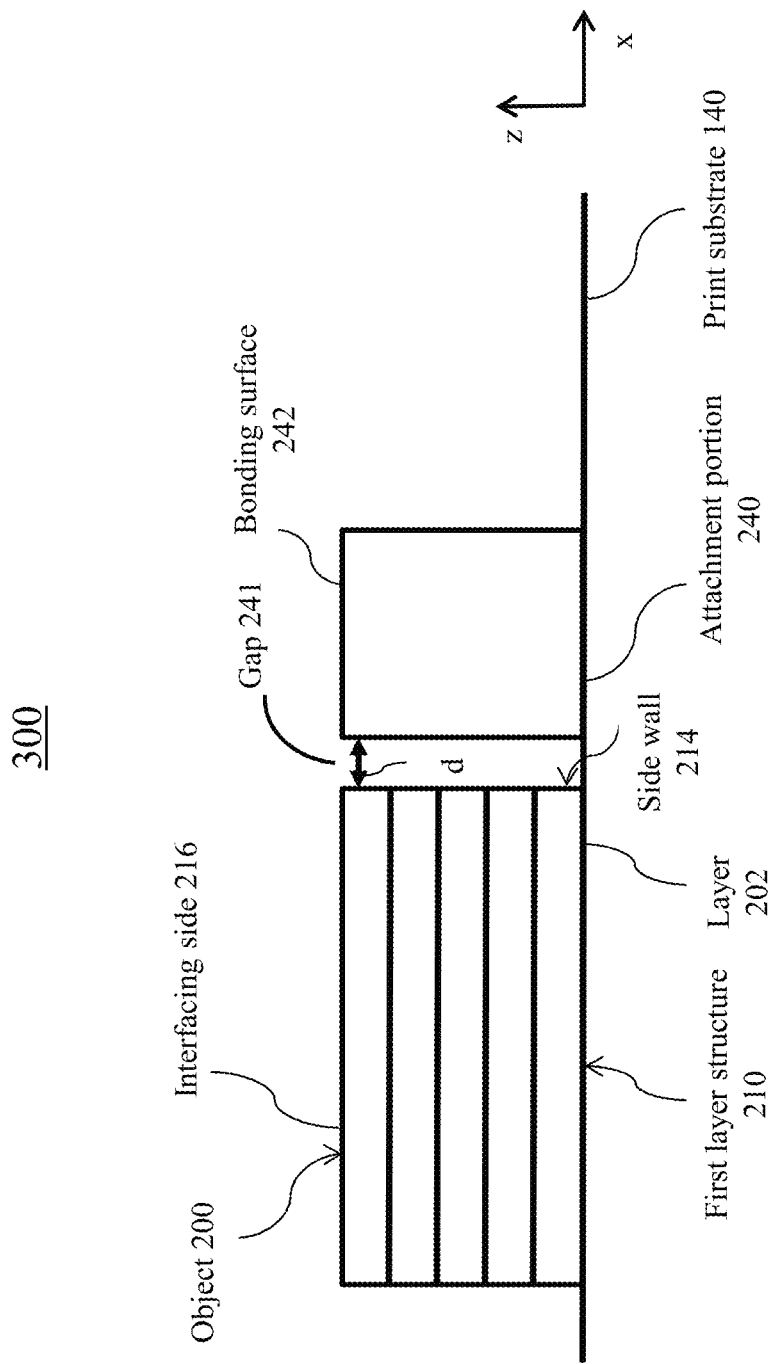
FIG. 6 is an exemplary cross-sectional diagram illustrating an alternative embodiment of the structure of FIG. 5 during manufacturing, wherein an attachment portion is positioned in the system.

Turning to FIG. 6, the attachment portion 240 is shown as being positioned at a distance d from the sidewall 214. Although FIG. 6 shows the attachment portion 240 and the first layer structure 210 as being placed on the print substrate 140 for illustrative purposes only, the attachment portion 240 and the first layer structure 210 can be positioned on any uniform and/or different planes, without limitation.

The attachment portion 240 is shown as providing the bonding surface 242 that is distal to the print substrate 140. The first layer structure 210 can include an interfacing side 216 distal to the print substrate 140. As illustratively shown in FIG. 6, the interfacing side 216 and the bonding surface 242 can be coplanar.

The distance d can be spacing between any points on the first layer structure 210 and the attachment portion 240. As illustratively shown in FIG. 6, the distance d can be a size of a gap 241 between the interfacing side 216 and the bonding surface 242. Stated somewhat differently, the distance d can be the spacing measured between regions of the attachment portion 240 and the first layer structure 210 that subsequent layers can be printed on.

FIG. 6 shows the gap 241 to be uniform for illustrative purposes only. The gap 241 can be uniform and/or different at various locations along the sidewall 214. For example, the sidewall 214 can have a curved, slanted and/or irregular shape, resulting in a non-uniform gap 241 and a non-uniform distance d along the sidewall 214. In one example, the distance d can be zero and/or non-zero at different locations. In other words, the sidewall 214 can be partially in contact with the attachment portion 240.

Although FIG. 6 shows the first layer structure 210 and the attachment portion 240 as having the gap 241 in a plane defined by z- and x-directions, the first layer structure 210 and the attachment portion 240 can be separated and/or in contact in a plane defined by n- and y-directions and/or any other planes, without limitation.

Figure 7:
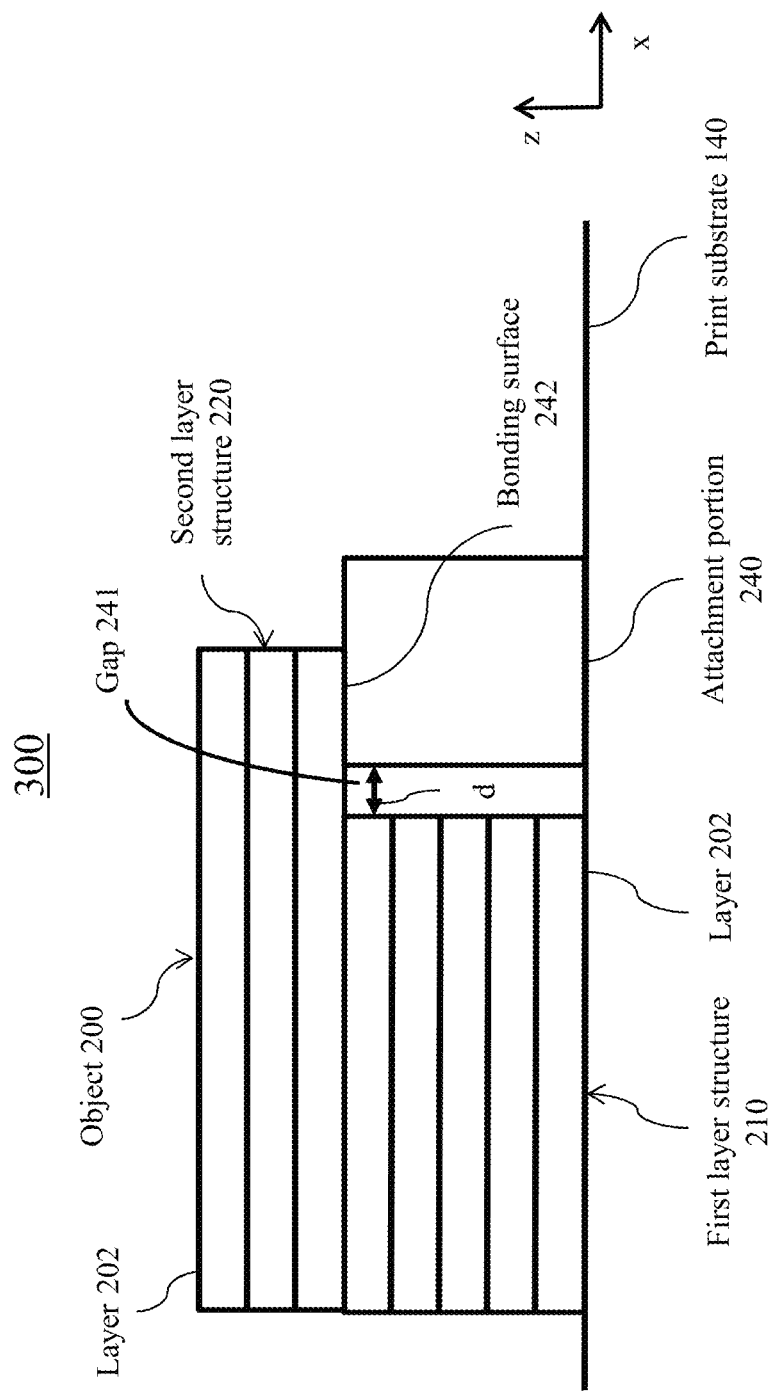
FIG. 7 is an exemplary cross-sectional diagram illustrating an alternative embodiment of the structure of FIG. 6 during manufacturing, wherein a second layer structure is printed on the attachment portion.

Turning to FIG. 7, a second layer structure 220 is shown as being disposed on the attachment portion 240 and the first layer structure 210. The second layer structure 220 is shown as including one or more layers 202 being stacked in the z-direction. In one embodiment, the second layer structure 220 can be manufactured using the same additive manufacturing techniques that manufacture the first layer structure 210.

The second layer structure 220 is shown as spanning the gap 241. The distance d can be any suitable length. A small distance d can advantageously reduce possibility of deformation of the second layer structure 220 that spans the gap 241. The distance d can be determined by bridging capability of the second layer structure 220, that is, ability of the material of the second layer structure 220 to overhang without any support in a vertical direction from space below the second layer structure 220. In one embodiment, the distance d can be zero. Advantageously, the second layer structure 220 can be fully supported during printing and deformation can be reduced or prevented.

Figure 8:
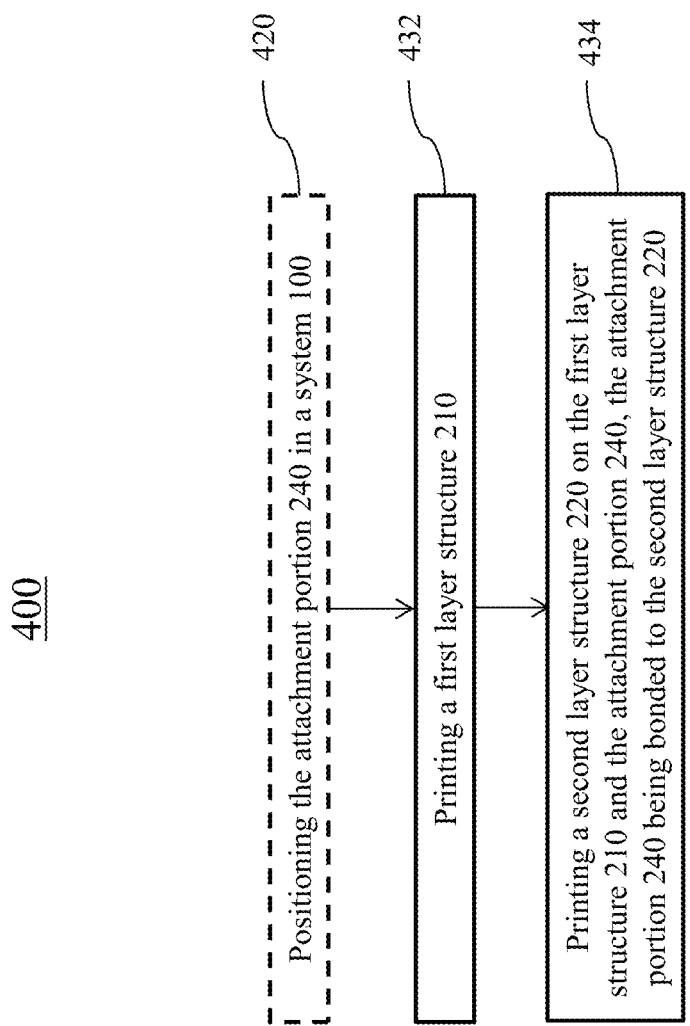
FIG. 8 is an exemplary flow chart illustrating an alternative embodiment of the method of FIG. 3, wherein the method includes printing a first layer structure.

Turning to FIG. 8, an exemplary flow chart of an alternative embodiment of the method 400 for making the structure 300 (shown in FIG. 7) is shown. The first layer structure 210 can be printed, at 432. The second layer structure 220 can be printed, at 434, on the attachment portion 240 and the first layer structure 210. Upon being printed, the second layer structure 220 can be bonded to the attachment portion 240. Advantageously, the attachment portion 240 can replace printed infill/support in the structure 300. Advantageously, the attachment portion 240 can provide structural strength and/or any other selected properties to the structure 300, and a secondary operation for attaching the attachment portion 240 to the second layer structure 220 can be eliminated.

Optionally, the attachment portion 240 can be positioned, at 420, in the system 100. The attachment portion 240 can be positioned at the selected distance d from the first layer structure 210. Although FIG. 8 shows the optional positioning at 420 as being performed before the printing at 432 for illustrative purposes only, the positioning at 420 can be performed after and/or during the printing at 432, without limitation. In other words, the attachment portion 240 can be positioned after printing the first layer structure 210 and before printing the second layer structure 220. For example, the printing process can have a pause or time interval after printing the first layer structure 210 and before printing the second layer structure 220. The attachment portion 240 can be positioned during the time interval manually by an operator and/or in a machine-assisted manner (for example, robotically). Advantageously, the attachment portion 240 can be positioned without impeding the process of printing the first layer structure 210. Additionally and/or alternatively, the attachment portion 240 can be placed prior to finishing the printing of the first layer structure 210. The process of positioning the attachment portion 240 can be significantly shorter than the process of printing the first layer structure 210.

Figure 9:
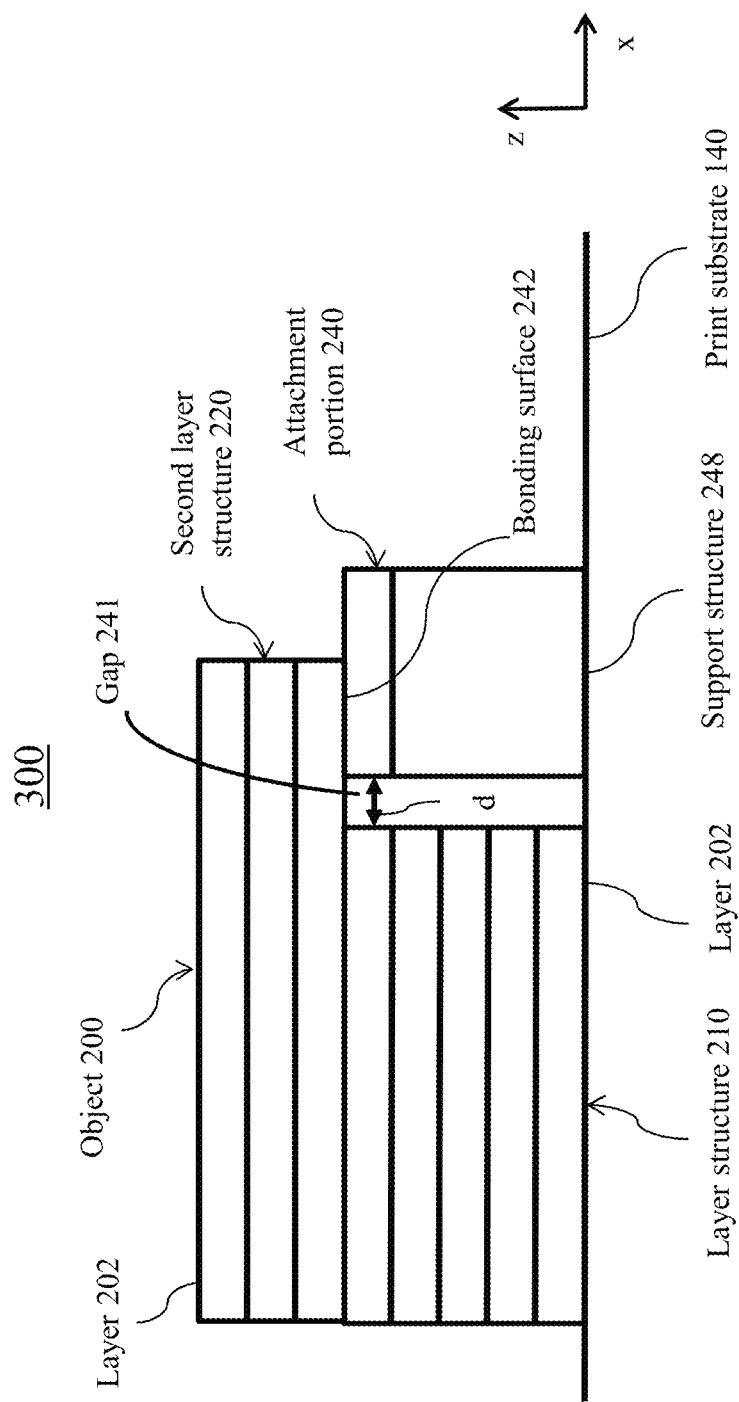
FIG. 9 is an exemplary cross-sectional diagram illustrating an alternative embodiment of the structure of FIG. 7, wherein the attachment portion is attached to a support structure.

Turning to FIG. 9, the attachment portion 240 is shown as being attached to a support structure 248. Stated somewhat differently, the support structure 248 can support the attachment portion 240 such that the attachment portion 240 can be elevated from the print substrate 140 by a selected height.

The support structure 248 can have any selected shape and size. The support structure 248 can be made using any suitable materials and processes. In one embodiment, the support structure 248 can be made using 3D printing. Advantageously, 3D printing can make the support structure 248 that has complex contours. Additionally and/or alternatively, the support structure 248 can be made of a material including foam. The foam can be machined to obtain selected size and shape. Advantageously, the support structure 248 can be made in an inexpensive manner.

The attachment portion 240 can be fixed in position relative to the support structure 248 in any suitable manner including, for example, vacuum, taping, clamping, bolting, and/or applying a removable adhesive. Additionally and/or alternatively, the attachment portion 240 can be fixed in position relative to the support structure 248 via a mechanical connection such as a cooperating detent. In one embodiment, the attachment portion 240 can be temporarily attached to the support structure 248.

Figure 10:
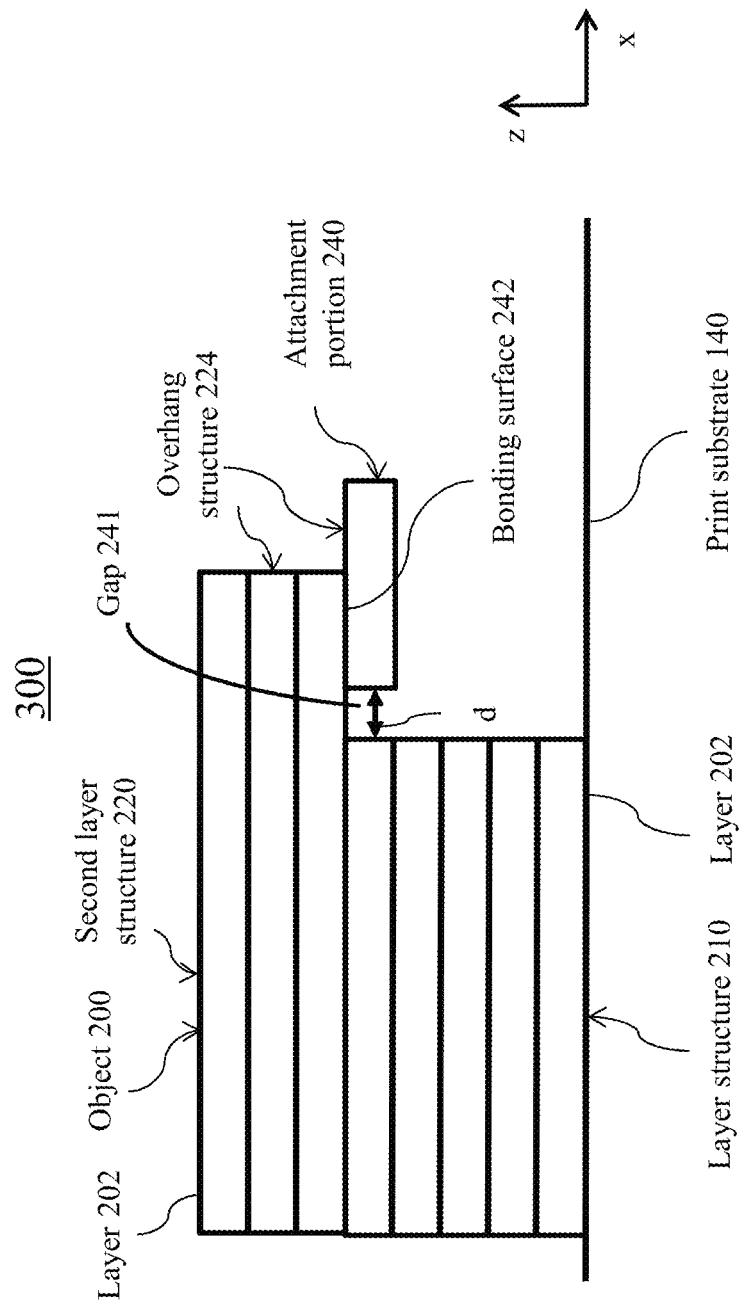
FIG. 10 is an exemplary cross-sectional diagram illustrating an alternative embodiment of the structure of FIG. 9, wherein the support structure is removed from the attachment portion.

Turning to FIG. 10, the support structure 248 is shown as being removed from the attachment portion 240. The portion of the second layer structure 220 that extends beyond the first layer structure 210 and the attachment portion 240 can form an overhang structure 224. The overhang structure 224 can maintain shape before and/or after removal of the support structure 248. Stated somewhat differently, even though being unsupported and positioned on empty space, the overhang structure 224 does not deform or break away from the second layer structure 220 under gravity.

The support structure 248 can be removed from the attachment portion 240. Removing the support structure 248 from the attachment portion 240 can include detaching the support structure 248 from direct contact with the attachment portion 240. The support structure 248 can be removed at any suitable time. In one embodiment, the second layer structure 220 can be cooled to room temperature and/or solidified before the support structure 248 is removed from the attachment portion 240. Advantageously, the support structure 248, in combination with the attachment portion 240, can provide support to the second layer structure 220 during the cooling and/or solidification to avoid deformation of the second layer structure 220. Upon completion of the cooling and/or solidification, the second layer structure 220 can gain sufficient structural strength and does not deform even after the support structure 248 is removed.

Figure 11:
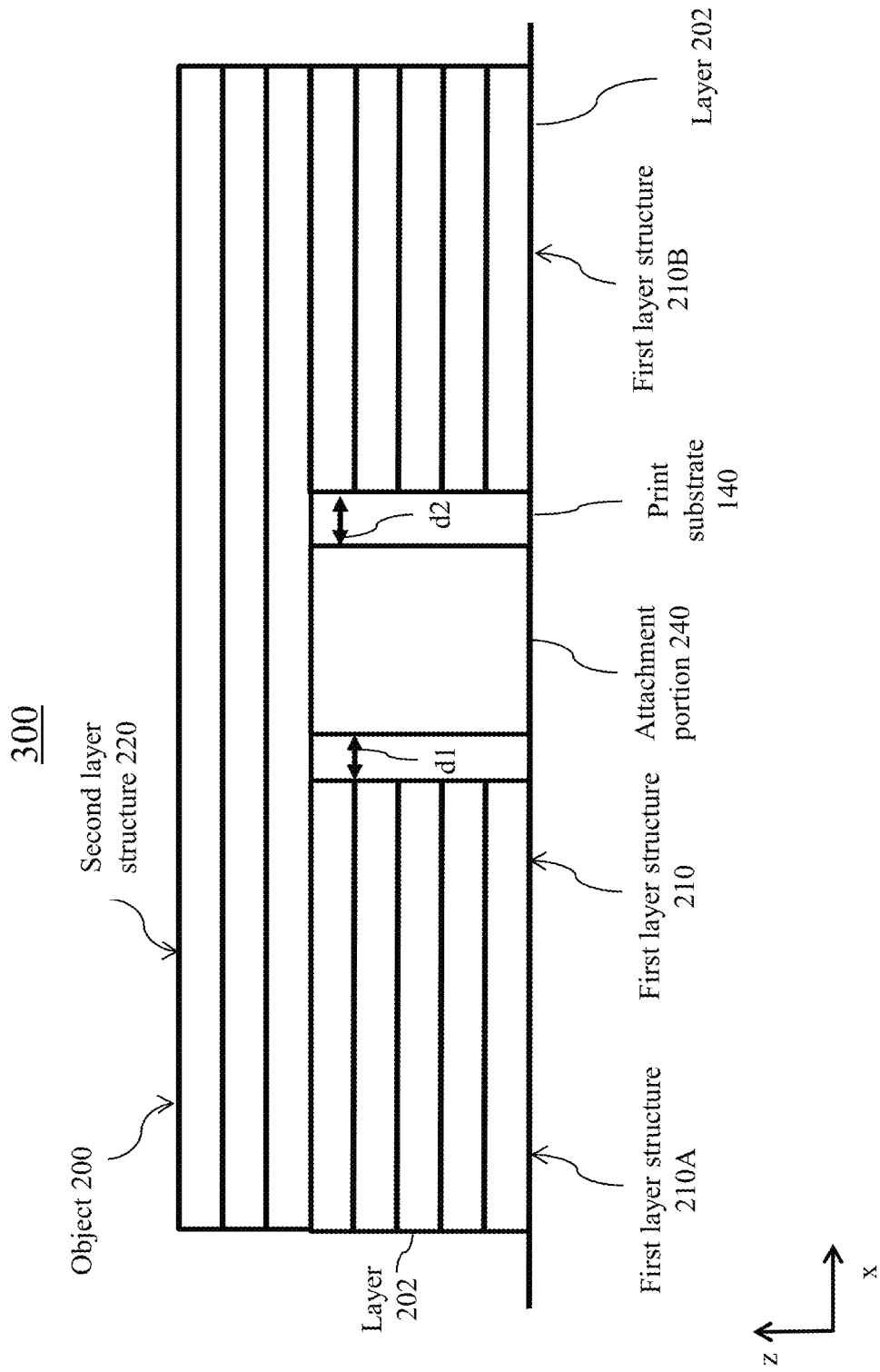
FIG. 11 is an exemplary cross-sectional diagram illustrating another alternative embodiment of the structure of FIG. 7, wherein the object includes first and second layer structures and an attachment portion, the second layer structures printed on the attachment portion and gaps separating the first layer structure and the attachment portion.

Turning to FIG. 11, the first layer structure 210 is shown as including first layer structures 210A, 210B. Each of the first layer structures 210A, 210B is shown as including one or more layers 202 being stacked in the z-direction. The first layer structures 210A, 210B can include uniform and/or different numbers of the layers 202. In one embodiment, the first layer structures 210A, 210B can include the same number of the layers 202. Advantageously the first layer structures 210A, 210B can be printed concurrently, and surfaces of the first layer structures 210A, 210B that are exposed to subsequent printing layers can be flush and/or co-planar.

FIG. 11 shows the attachment portion 240 as being located between the first layer structures 210A, 210B. The attachment portion 240 is shown as being at distances d1, d2 from the first layer structures 210A, 210B, respectively. The distances d1, d2 can be uniform and/or different. FIG. 11 shows the second layer structure 220 as being disposed on the first layer structures 210A, 210B and the attachment portion 240.

Figure 12:
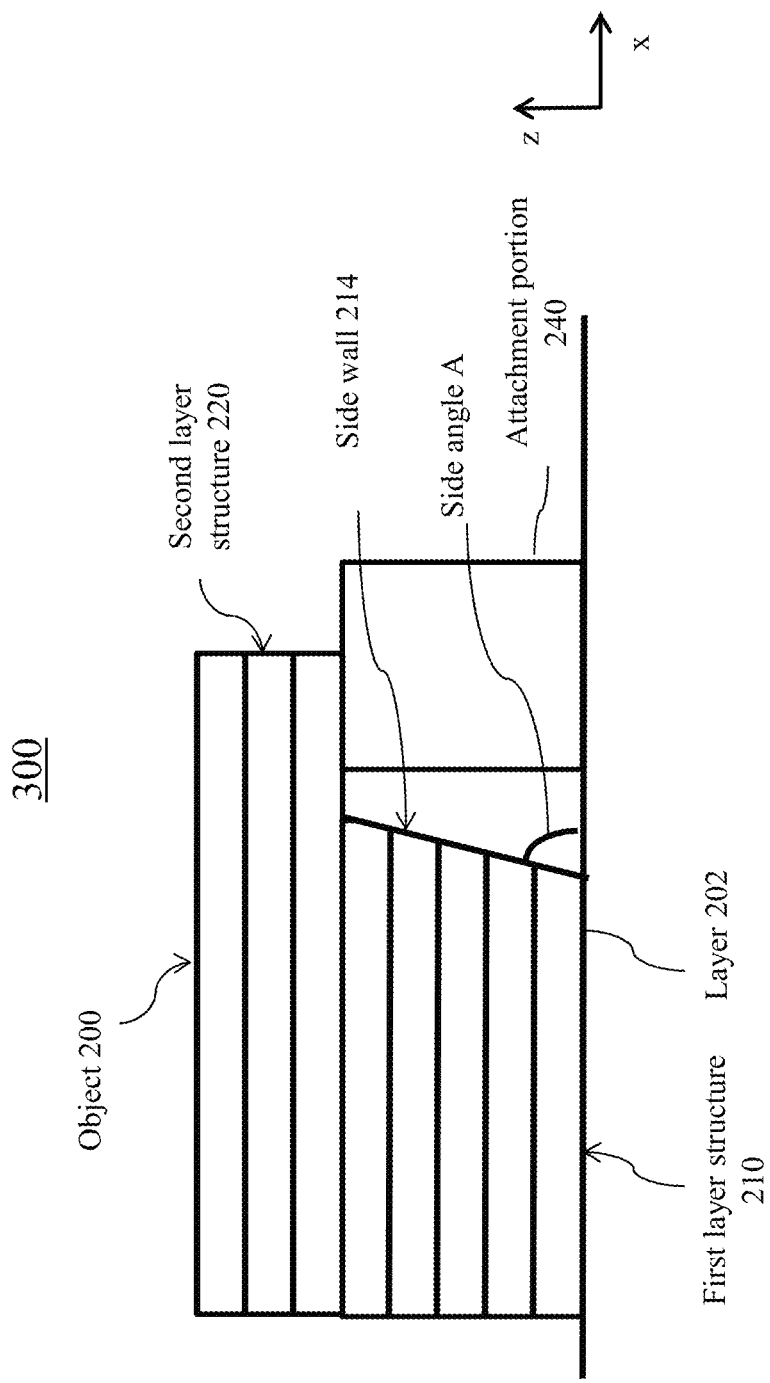
FIG. 12 is an exemplary cross-sectional diagram illustrating another alternative embodiment of the structure of FIG. 7, wherein the object includes has a tilted sidewall.

Turning to FIG. 12, the side wall 214 of the first layer structure 210 is shown as being a surface that tilts away from the z-direction. Stated somewhat differently, the side angle A is not a right angle. FIG. 12 shows the side angle A as being smaller than 90 degrees.

The side angle A can have any suitable values. The minimum value of the side angle A can be determined by the material, the printing process, and/or the aspect ratio. In one embodiment, when beads (not shown) for printing the first layer structure 210 are wide, the side angle A can be small. For example, when the beads have a great aspect ratio, the side angle A can be small. The aspect ratio can include a width (or size in y-direction) to height (or size in z-direction) ratio of the bead. Additionally and/or alternatively, when there is great solidification time between the layers 202, the side angle A can be small. An exemplary side angle A can range from 35 degrees to 90 degrees.

Figure 13:
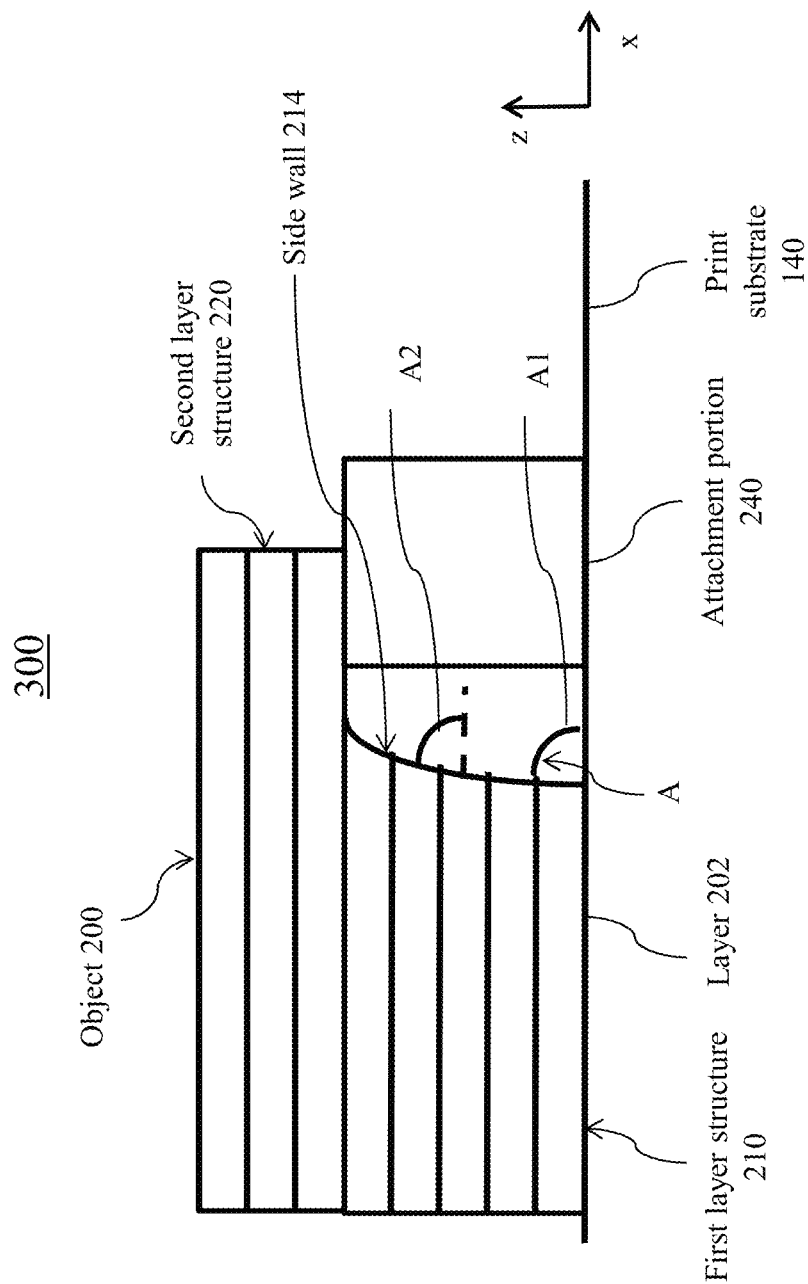
FIG. 13 is an exemplary cross-sectional diagram illustrating another alternative embodiment of the structure of FIG. 7, wherein the first layer structure has a curved sidewall.

Turning to FIG. 13, the side wall 214 of the first layer structure 210 is shown as including a curved surface tilting away from the z-direction. The side wall 214 can have a plurality of side angles A at respective locations along the side wall 214. As illustrated in FIG. 13, the side angles A are shown as including a side angle A1 at an end region of the side wall 214 and a side angle A2 at a middle region of the side wall 214. The side angles A1 and A2 can be uniform and/or different.

The minimum value of each of the side angles A1, A2 can be determined by the material, printing process, and/or the aspect ratio. In one embodiment, when beads (not shown) for printing the first layer structure 210 are wide, the side angles A1, A2 can be small. For example, when the beads have a great aspect ratio, the side angles A1, A2 can be small. The aspect ratio can include a width (or size in y-direction) to height (or size in z-direction) ratio of the bead. Additionally and/or alternatively, when there is great solidification time between the layers 202, the side angles A1, A2 can be small. Exemplary side angles A1, A2 can each range from 35 degrees to 90 degrees.

Although the side wall 214 is shown as being straight in FIG. 12 and curved in FIG. 13 for illustrative purposes only, the side wall 214 can be straight, curved, or a combination thereof, without limitation.

Figure 14:
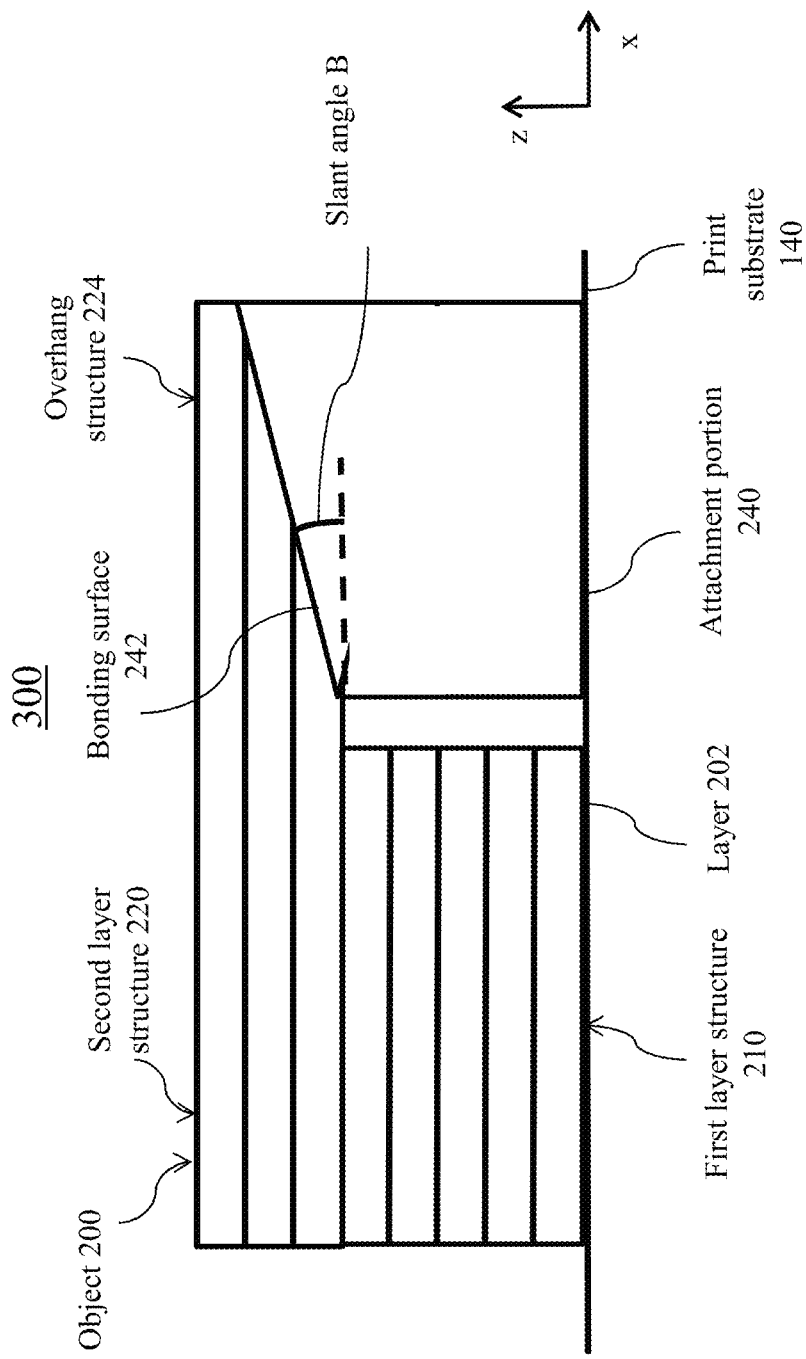
FIG. 14 is an exemplary cross-sectional diagram illustrating another alternative embodiment of the structure of FIG. 7, wherein the second layer structure has a slant angle.

Turning to FIG. 14, the bonding surface 242 is shown as interfacing with the second layer structure 220. Morphology and/or shape of the bonding surface 242 can determine the second layer structure 220 that is printed on the attachment portion 240. FIG. 14 shows a slant angle B as existing between the bonding surface 242 and the print substrate 140. Effectively, the overhang structure 224 formed on the attachment portion 240 can have a side wall at the slant angle B relative to the print substrate 140.

The slant angle B can have any suitable values. In one embodiment, the slant angle B can have a value that is difficult and/or impossible to achieve in 3D printing without being supported by the attachment portion 240. An exemplary slant angle B can range from 0 degree to 45 degrees or from 0 degree to 35 degrees. Advantageously, when the second layer structure 220 is made of a material that has limited over-hanging capability, or made using a process that allows limited over-hanging, and cannot form the slant angle B at a small value without any support, the attachment portion 240 can provide support to make such small slant angle B feasible.

In one embodiment, the slant angle B can be zero. The bonding surface 242 can thus be parallel to the print substrate 140. For example, the bonding surface 242 can be co-planar with the interfacing side 216 (shown in FIG. 6) of the first layer structure 210.

Figure 15:
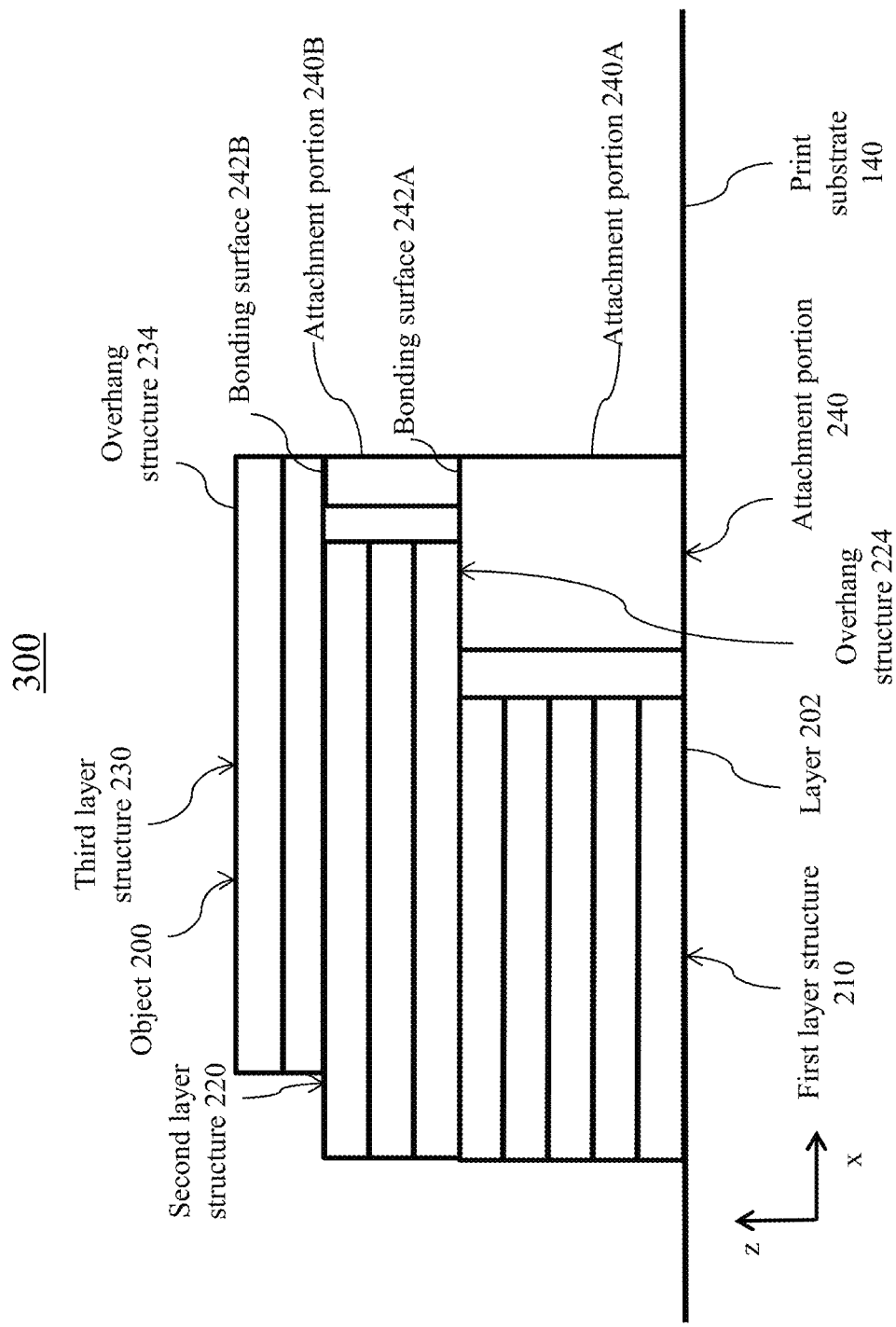
FIG. 15 is an exemplary cross-sectional diagram illustrating an alternative embodiment of the structure of FIG. 7, wherein the structure includes a third layer structure.

Turning to FIG. 15, the attachment portion 240 is shown as including an attachment portion 240A and an attachment portion 240B stacked on the attachment portion 240A. The attachment portion 240B is shown as having a bonding surface 242B that is more distal to the print substrate 140 than a bonding surface 242A of the attachment portion 240A. The object 200 is shown as including a third layer structure 230 formed on the second layer structure 220 and on the attachment portion 240B. Upon being printed, the second layer structure 220 can be bonded to the attachment portion 240A. Additionally and/or alternatively, upon being printed, the third layer structure 230 can be bonded to the attachment portion 240B.

Although FIG. 15 shows the attachment portion 240B as being stacked on the attachment portion 240A, the attachment portion 240B can be located on any surface, such as the print substrate 140 and/or on any previously-printed layers, without limitation. For example, the attachment portion 240B can be located on a support structure 248 (shown in FIG. 9) and the support structure 248 can be stacked on the attachment portion 240A. Optionally, the support structure 248 can be removed from the attachment portion 240B upon bonding between the attachment portion 240B and the third layer structure 230. Although FIG. 15 shows the attachment portions 240A, 240B, any number of uniform and/or different attachment portions 240 can be used.

Figure 16:
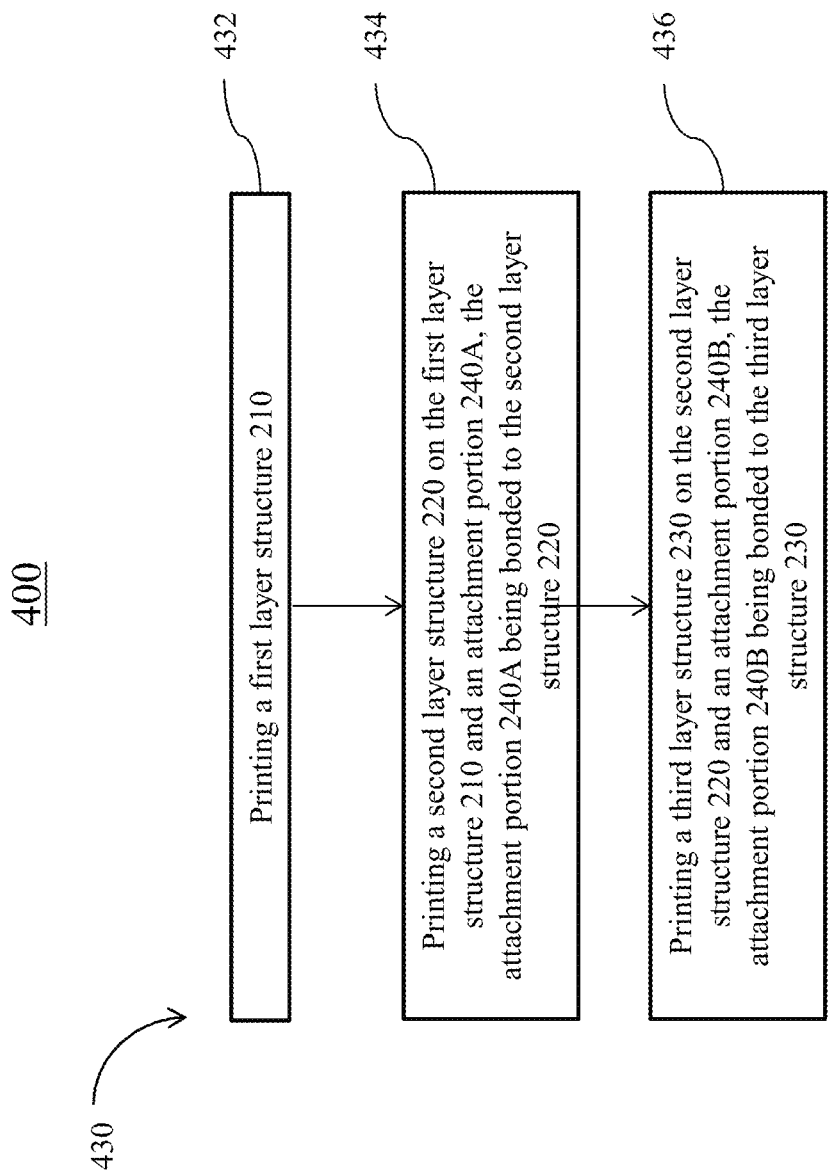
FIG. 16 is an exemplary flow chart illustrating another alternative embodiment of the method of FIG. 3, wherein the method includes printing a third layer structure.

Turning to FIG. 16, an exemplary flow chart of an embodiment of the method 400 for manufacturing the structure 300 (shown in FIG. 15) is shown. The method 400 is shown as including further details of the printing at 430. The first layer structure 210 can be printed, at 432. The second layer structure 220 can be printed, at 434, on the first layer structure 210 and the attachment portion 240A. The attachment portion 240A can be bonded to the second layer structure 220. The third layer structure 230 can be printed, at 436, on the second layer structure 220 and the attachment portion 240B. The attachment portion 240B can be bonded to the third layer structure 230.

Stated somewhat differently, the printing at 434 can be repeatedly performed, as shown at 436, by positioning additional attachment portions 240 to print on, to create multiple overhang structures 224, 234 (shown in FIG. 15) of the object 200 (shown in FIG. 15) at different height and/or distances from the print substrate 140 (shown in FIG. 15). Although shown as being repeatedly performed once in FIG. 16, the printing at 434 can be repeatedly performed for any number of times, without limitation.

Figure 17:
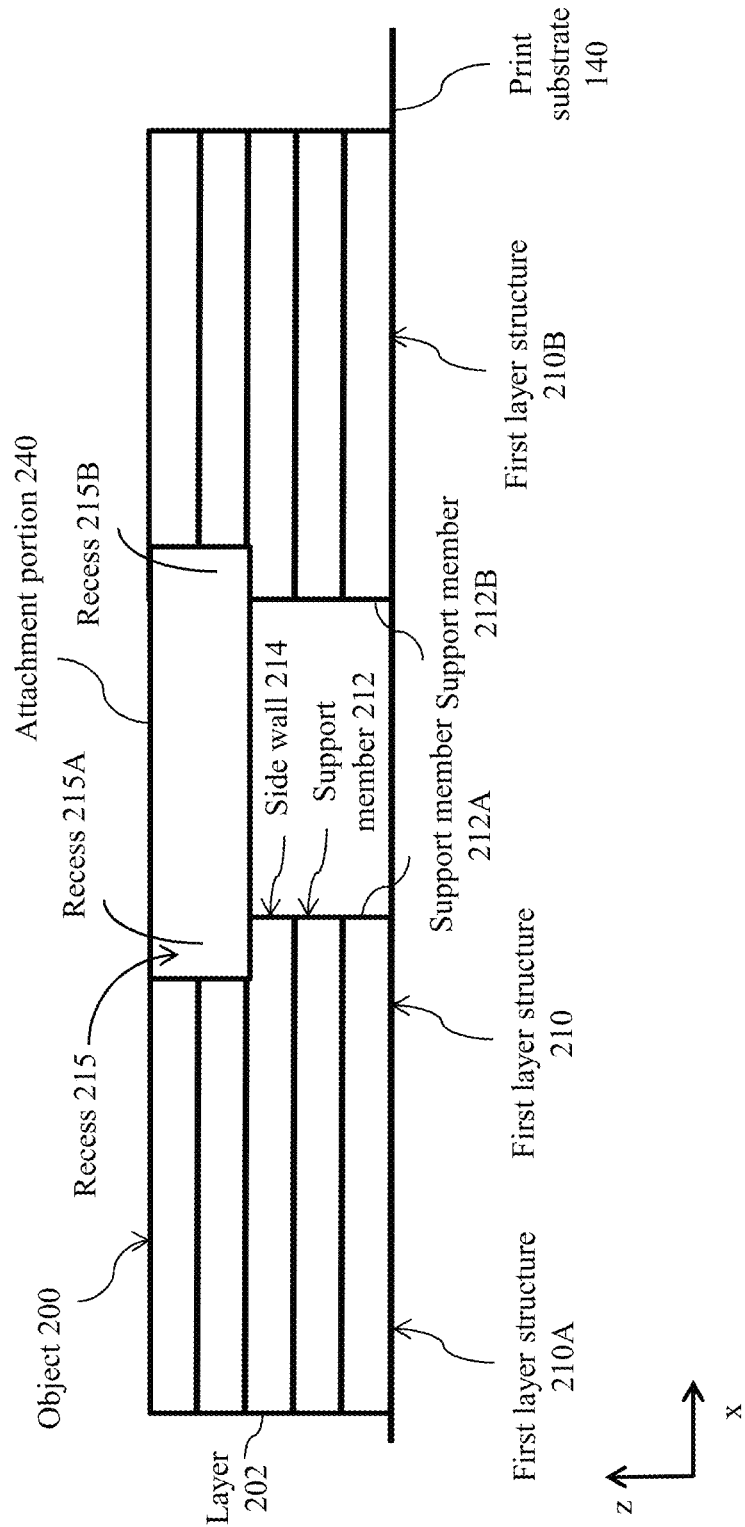
FIG. 17 is an exemplary cross-sectional diagram illustrating another alternative embodiment of the structure of FIG. 7 during manufacturing, wherein the first layer structure includes a support member.

Turning to FIG. 17, an exemplary cross section of the structure 300 is shown. Of the structure 300, the object 200 is shown as including the first layer structure 210. The first layer structure 210 is shown as including a support member 212. The support member 212 can include a portion of one or more selected layers 202 of the first layer structure 210 that are adjacent to the sidewall 214 or a peripheral region of the first layer structure 210. The support member 212, in combination with the layers 202 of the first layer structure 210 that are adjacent to the support member 212, can define a recess 215 that can at least partially accommodate the attachment portion 240. The support member 212 can thus allow the attachment portion 240 to be positioned (and/or bonded in place) at an elevated location at least partially above empty space. Stated somewhat differently, the support member 212 can be located on the first layer structure 210 without contacting the print substrate 140. In some embodiments, adhesives can be applied to the bottom surface and/or sides of the attachment portion 240 for at least temporary bonding with the object 200, for example, within the recess 215.

The support member 212 can have any suitable shapes. FIG. 17 shows the support member 212 as including a wall that includes a portion of one or more layers 202 that are proximal to the print substrate 140. The attachment portion 240 can be located on an end region of the wall distal to the print substrate 140.

Although FIG. 17 shows two first layer structures 210A, 210B each including the support member 212A, 212B for illustrative purposes only, the object 200 can include one first layer structure 210, or one or more uniform and/or different first layer structures 210. Each first layer structure 210 can include one support member 212, or any number of uniform and/or different support members 212, without limitation. Although FIG. 17 shows the first layer structures 210A, 210B each being in contact with the attachment portion 240 in x-direction, any uniform and/or different distances d (shown in FIG. 7) can exist between the first layer structure 210 and the attachment portion 240 in x- and/or y-directions.

Figure 18:
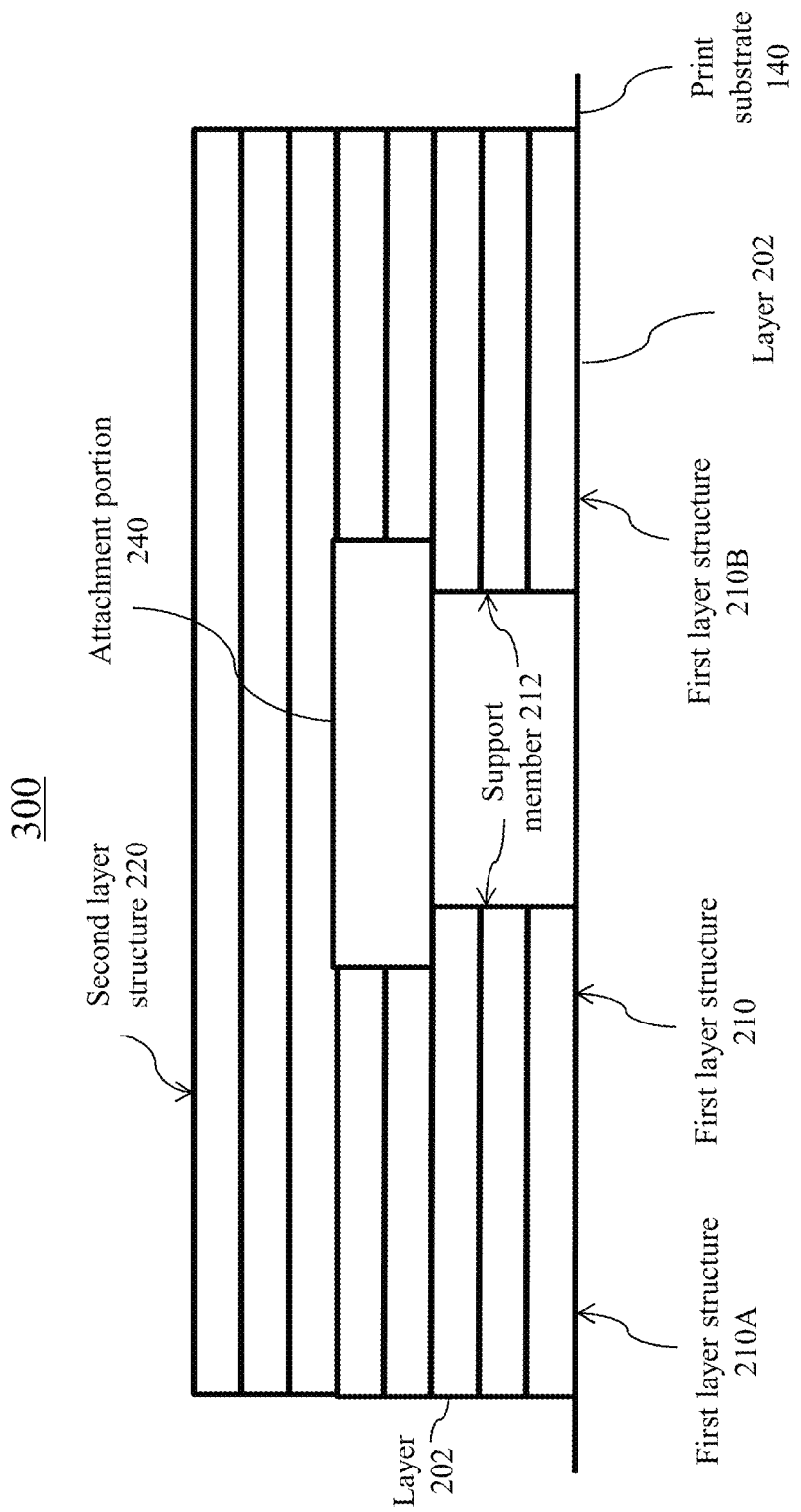
FIG. 18 is an exemplary cross-sectional diagram illustrating another alternative embodiment of the structure of FIG. 17, wherein the second layer structure is printed on the attachment portion.

Turning to FIG. 18, the second layer structure 220 is shown as being disposed on the attachment portion 240 and the first layer structure 210. Upon being printed, the second layer structure 220 can bond with the attachment portion 240. Advantageously, the second layer structure 220 can be supported during printing, and deformation of the second layer structure 220 due to the gap between the first layer structures 210A, 210B can be reduced or prevented.

Advantageously, because the attachment portion 240 can be supported by the first layer structure 210, the attachment portion 240 can be positioned with minimal need of any support (e.g., the support structure 248 (shown in FIG. 9)). When printed infill or other support structure between the attachment portion 240 and the print substrate 140 is not desired, additional steps of positioning and removing the support structure 248 can advantageously be eliminated. The size of the attachment portion 240 in the z-direction can be smaller than, and does not need to be equal to, the size of the first layer structure 210. Therefore, the size of the attachment portion 240 can be selected with greater flexibility.

Figure 19:
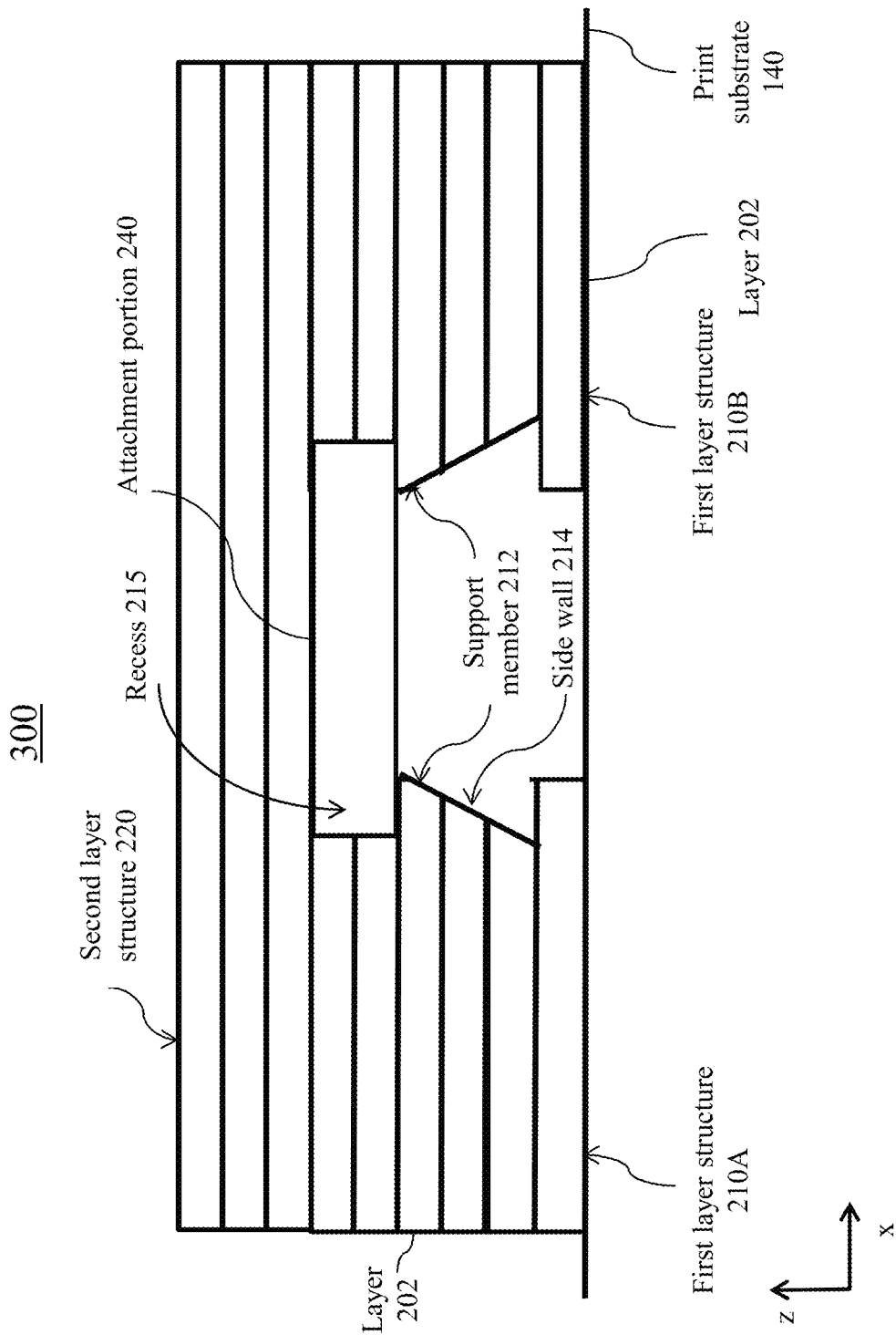
FIG. 19 is an exemplary cross-sectional diagram illustrating another alternative embodiment of the structure of FIG. 18, wherein the support member has a non-uniform side wall.

Turning to FIG. 19, the support member 212 is shown as having the side wall 214 as being non-uniform. Stated somewhat differently, the side wall 214 of the first layer structure 210 is shown as including a surface that tilts away from the z-direction and being non-vertical to the print substrate 140. In other words, the support member 212 can include one or more layers 202 that branch out distally from the print substrate 140 to form a shelf. Because the first layer structure 210 can still define the recess 215, the attachment portion 240 can still be supported by the support member 212.

Although FIG. 19 shows part of the side wall 214 to deviate from z-direction for illustrative purposes only, the side wall 214 can be partially and/or entirely deviated from the z-direction, without limitation. Although FIG. 19 shows the side wall 214 to include a plurality of straight sections for illustrative purposes only, the side wall 214 can include any number of uniform and/or different sections that are each straight and/or curved, without limitation.

The disclosed embodiments further disclose the structure 300 (shown in FIG. 2A) that is made via additive manufacturing. The structure 300 can include the object 200 (shown in FIG. 2A) and the attachment portion 240 (shown in FIG. 2A) bonded to the object 200. The disclosed embodiments further disclose the structure 300 as shown in FIGS. 4, 7, 9, 10, 11-15 and 17-19.

Figure 20:
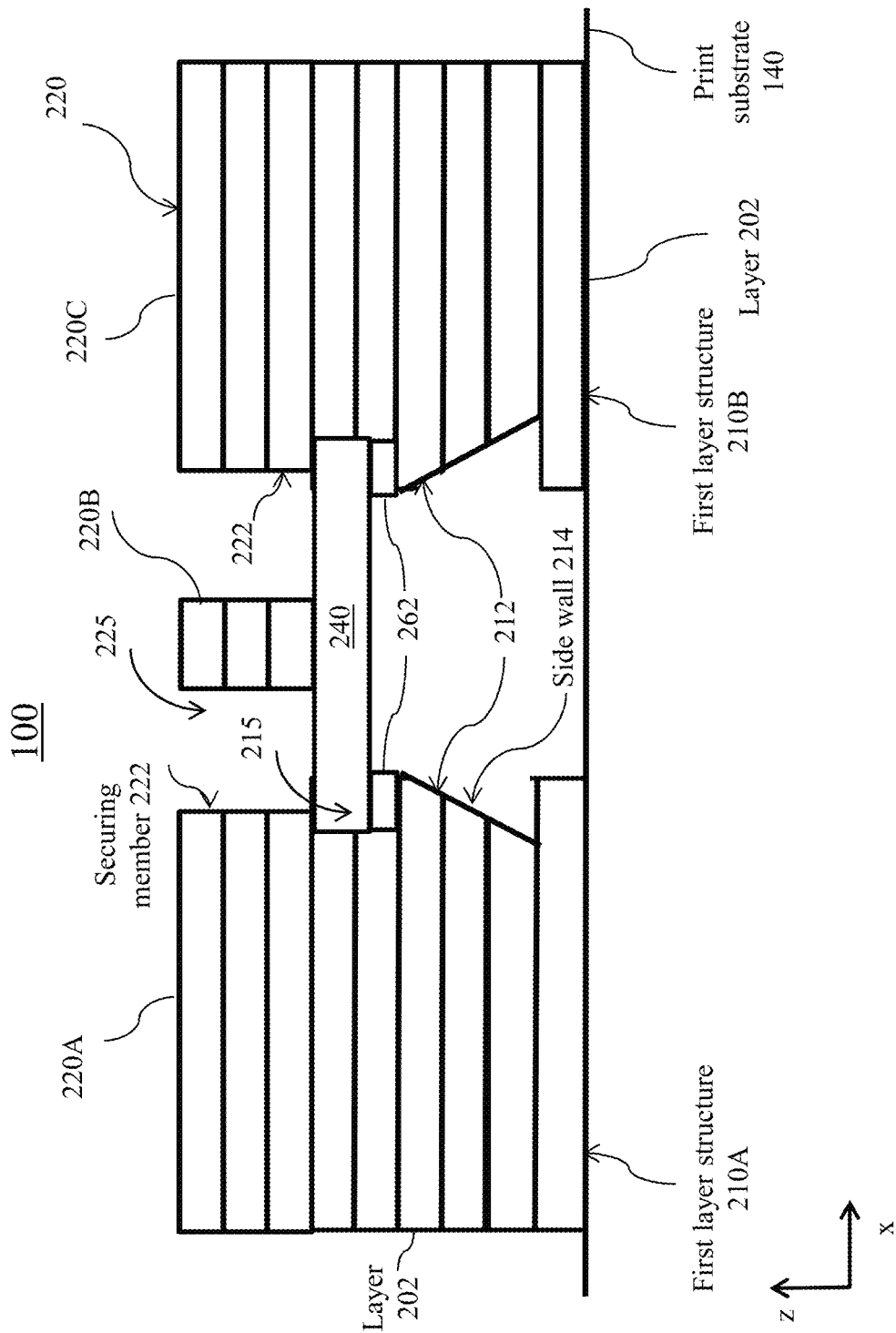
FIG. 20 is an exemplary diagram illustrating another alternative embodiment of the structure of FIG. 17, wherein the attachment portion is attached to a secondary bonding layer.

Turning to FIG. 20, an optional secondary bonding layer 262 is shown as being disposed on the support member 212. Exemplary secondary bonding layer 262 can be made of an adhesive material. For example, the secondary bonding layer 262 can be the same or similar to various examples of the bonding layer 244 (shown in FIG. 4A) as disclosed above. The attachment portion 240 can be attached to the support member 212 via the secondary bonding layer 262.

Although FIG. 20 shows the secondary bonding layer 262 as being disposed at a bottom of the recess 215 that is parallel to the print substrate 140 for illustrative purposes only, the secondary bonding layer 262 can be applied to any surface(s) of the recess 215 that is not parallel to the print substrate 140. For example, the secondary bonding layer 262 can be applied to side surfaces of the attachment portion 240 that can be vertical to, and/or at any angle with, the print substrate 140.

Additionally and/or alternatively, the second layer structure 220 is shown as including a securing member 222. The securing member 212 can include a portion of one or more selected layers 202 of the second layer structure 220 that forms on an edge region of the attachment portion 240. Stated somewhat differently, the securing member 212 can include a peripheral region of the second layer structure 220 formed on the attachment portion 240. The securing member 212 can capture the attachment portion 240 and prevent the attachment portion 240 from moving in the z direction. Advantageously, the attachment portion 240 can be secured in place.

Additionally and/or alternatively, a plurality of second layer structures 220, including second layer structures 220A-220C, are shown as being formed to partially cover the attachment portion 240. Stated somewhat differently, a gap 225 is defined between neighboring second layer structures 220 and thus the plurality of second layer structures 220 are not continuously connected across the attachment portion 240. Advantageously, the second layer structure 220 does not necessarily bridge the two first layer structures 210 and the attachment portion 240 can enable a great variety of shapes for overhang structures.

Although FIGS. 21-24 shows the cross section of the system 100 in the x-z plane. The structure 300 (shown in FIG. 2) can be printed in alternative manners such that the cross section of the system 100 in the y-z plane can be the same and/or similar to the cross section as shown in FIGS. 21-24.

Figure 21:
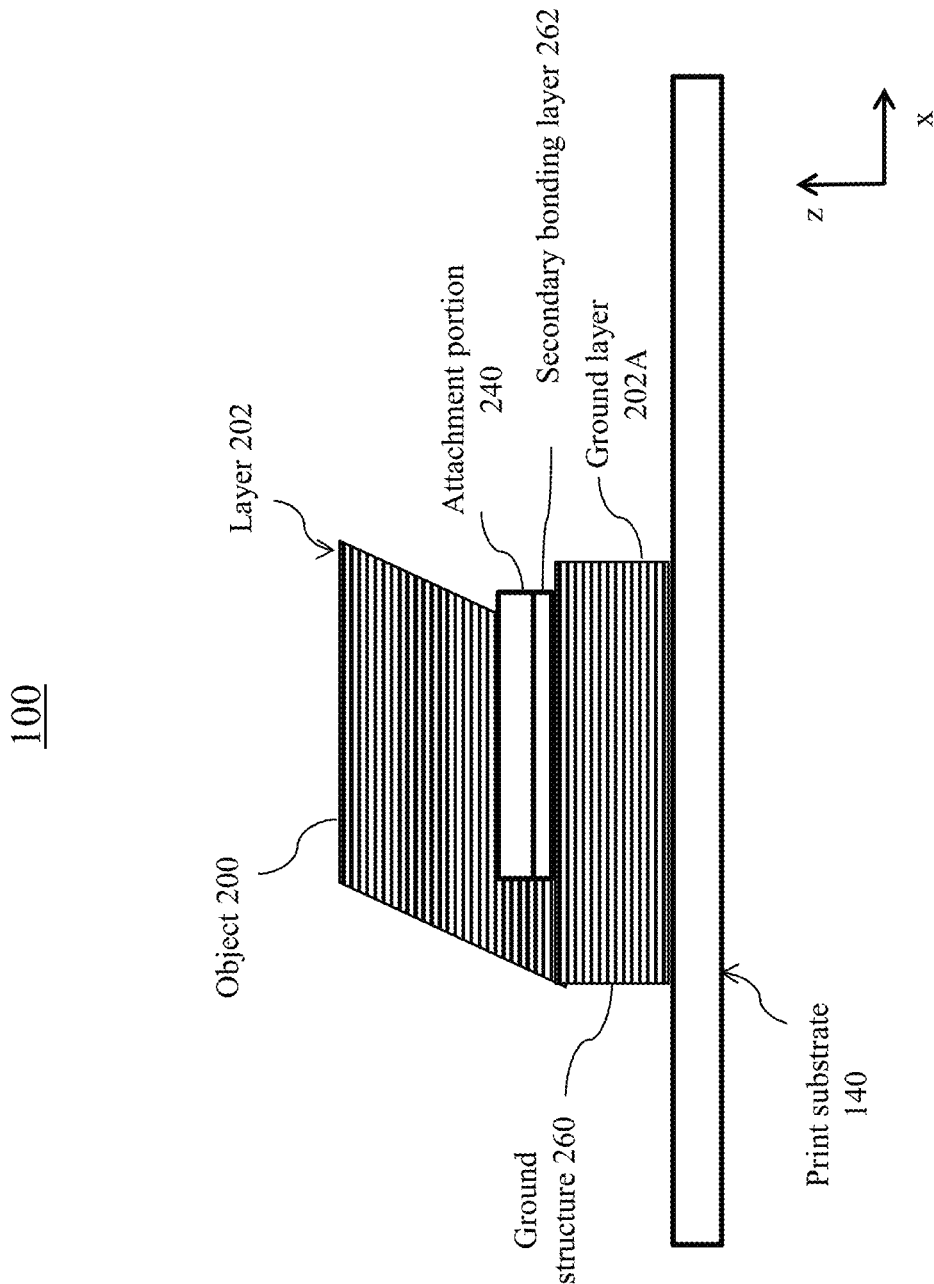
FIG. 21 is an exemplary diagram illustrating another alternative embodiment of the system of FIG. 2A, wherein the attachment portion is attached to a ground structure.

Turning to FIG. 21, a ground structure 260 is shown as being positioned on the print substrate 140. The ground structure 260 can include any suitable structures. FIG. 21 shows the ground structure 260 as including one or more ground layers 202A. In one embodiment, the ground layers 202A can be 3D printed. The optional secondary bonding layer 262 is shown as being disposed on the ground structure 260. The attachment portion 240 can be attached to the ground structure 260 via the secondary bonding layer 262.

As shown in FIG. 21, the ground structure 260 can be an integral part of the object 200. Stated somewhat differently, the layers 202 of the object 200 can be at least partially stacked on the ground structure 260. However, the object 200 can be entirely printed on the attachment portion and separated from the ground structure 260, without limitation.

Figure 22:
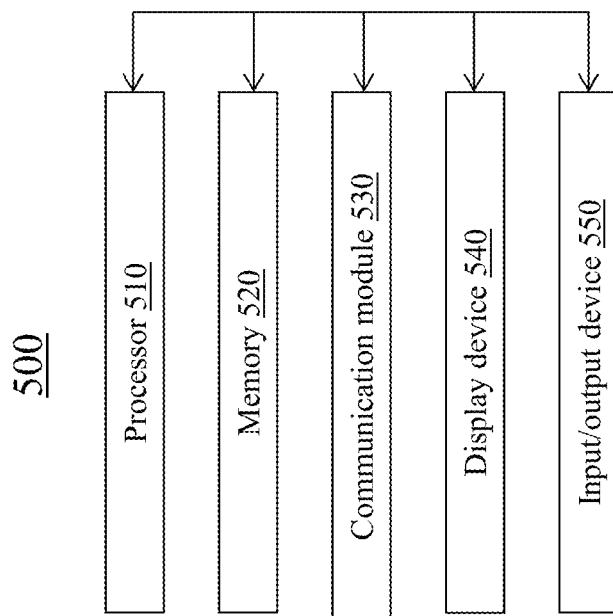
FIG. 22 is an exemplary diagram illustrating an embodiment of a control system for controlling the system of FIG. 1.

Turning to FIG. 22, a control system 500 for additive manufacturing is shown. The control system 500 can be configured for controlling the print head 120 (shown in FIG. 1). The control system 500 can include a processor 510. The processor 510 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like.

The processor 510 can execute instructions for implementing the control system 500 and/or computerized model of the object 200 (shown in FIG. 2A). In an un-limiting example, the instructions includes one or more additive manufacturing software programs. The programs can operate to control the system 100 with multiple printing options, settings and techniques for implementing additive printing of large components.

The programs can include a computer-aided design (CAD) program to generate a 3D computer model of the object 200. Additionally and/or alternatively, the 3D computer model can be imported from another computer system (not shown). The 3D computer model can be solid, surface or mesh file format in an industry standard.

The programs can load the 3D computer model, create a print model and generate the machine code for controlling the system 100 to print the object 200. Exemplary programs can include LSAM Print 3D, available from Thermwood Corporation located in Dale, Ind. Additionally and/or alternatively, exemplary programs can include Unfolder Module Software, Bend Simulation Software, Laser Programming and/or Nesting Software available from Cincinnati Incorporated located in Harrison, Ohio.

As shown in FIG. 22, the control system 500 can include one or more additional hardware components as desired. Exemplary additional hardware components include, but are not limited to, a memory 520 (alternatively referred to herein as a non-transitory computer readable medium). Exemplary memory 520 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the control system 500 and/or computerized model of the object 200 can be stored on the memory 520 to be executed by the processor 510.

Additionally and/or alternatively, the control system 500 can include a communication module 530. The communication module 530 can include any conventional hardware and software that operates to exchange data and/or instruction between the control system 500 and another computer system (not shown) using any wired and/or wireless communication methods. For example, the control system 500 can receive computer-design data corresponding to the object 200 via the communication module 530. Exemplary communication methods include, for example, radio, Wireless Fidelity (Wi-Fi), cellular, satellite, broadcasting, or a combination thereof.

Additionally and/or alternatively, the control system 500 can include a display device 540. The display device 540 can include any device that operates to present programming instructions for operating the control system 500 and/or present data related to the print head 120. Additionally and/or alternatively, the control system 500 can include one or more input/output devices 550 (for example, buttons, a keyboard, keypad, trackball), as desired.

The processor 510, the memory 520, the communication module 530, the display device 540, and/or the input/output device 550 can be configured to communicate, for example, using hardware connectors and buses and/or in a wireless manner.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for additive manufacturing, comprising:
   positioning an attachment portion in a printer; and
   printing an object on the attachment portion, the attachment portion being configured to bond to the object at least partially via absorbing heat from the object during said printing, heat from a print substrate of the printer, or a combination thereof, wherein said printing includes:
   printing at least one first layer structure, each first layer structure including one or more first layers stacked in a stacking direction; and
   printing, after said positioning, a second layer structure on the at least one first layer structure and the attachment portion, wherein the second layer structure includes one or more second layers stacked in the stacking direction, wherein the attachment portion at least partially supports the second layer structure during said printing the second layer structure and is configured to bond to the second layer structure.

2. The method of claim 1, wherein the printer is a part of a large scale additive manufacturing system.

3. The method of claim 1, wherein the attachment portion is configured to bond to the object upon absorbing the heat from the object during said printing of the second layer structure.

4. The method of claim 1, wherein the attachment portion includes a perforated panel defining one or more openings, and said printing of the object includes printing the object on the attachment portion such that a part of the object flows through the one or more openings and forms one or more caps configured to interlock with the perforated panel.

5. The method of claim 1, wherein the attachment portion is made of a thermoplastic material, a thermoset material, or a combination thereof.

6. The method of claim 1, wherein said positioning includes:
   printing a plurality of layers stacked in the stacking direction and collectively forming a closed loop;
   filling space defined by the closed loop with a spray foam configured to expand in the space;
   expanding the spray foam; and
   cutting the expanded spray foam to be even with a top layer of the plurality of layers.

7. The method of claim 1, further comprising performing, before said printing of the object, a plasma treatment on the attachment portion.

8. The method of claim 1, further comprising preparing the attachment portion including:
   a base portion; and
   a bonding layer on the base portion.

9. The method of claim 8, wherein the base portion includes a perforated panel defining one or more openings, and wherein said preparing includes printing the bonding layer on the base portion such that a part of the bonding layer flows through the one or more openings and forms one or more caps configured to interlock with the perforated panel.

10. The method of claim 8, wherein said preparing includes disposing the bonding layer on the base portion, the bonding layer being configured to bond the base portion to the object upon absorbing the heat from the object during said printing of the object.

11. The method of claim 8, wherein said preparing includes disposing the bonding layer on the base portion, the bonding layer including a sheet that is a honeycomb-patterned polycarbonate sheet, a polyethylene terephthalate glycol (PETG) sheet, a layer at least partially made of thermoplastic polyurethane, a polyethylene terephthalate (PET) sheet, or a combination thereof.

12. The method of claim 8, wherein said preparing includes:
   printing, via the printer, the base portion, wherein the base portion includes one or more layers; and
   disposing the bonding layer on the base portion.

13. The method of claim 1, wherein said printing the at least one first layer structure includes printing a first layer structure having a side wall at a side angle relative to a direction of travel of a print head of the printer, the side angle being within a range from 35 degrees to 90 degrees.

14. The method of claim 13, wherein said printing the at least one first layer structure includes printing the first layer structure having the side wall with the side angle varying along the side wall.

15. The method of claim 13, wherein the side wall is curved, with the side angle decreasing along the stacking direction.

16. The method of claim 1, further comprising positioning a support structure in the printer, wherein said positioning the attachment portion includes positioning the attachment portion on the support structure.

17. The method of claim 16, further comprising preparing the support structure at least partially from foam.

18. The method of claim 16, wherein positioning the support structure includes printing the support structure using the printer.

19. The method of claim 1, wherein
   said printing the at least one first layer structure includes printing two first layer structures,
   the attachment portion is located between the two first layer structures, and
   said printing the second layer structure includes printing the second layer structure, wherein the second layer structure bridges the two first layer structures.

20. The method of claim 19, wherein said printing the two first layer structures includes printing the two first layer structures on the print substrate, wherein each first layer structure defines a recess for accommodating the attachment portion at an elevated location above, and without contacting, the print substrate.

21. The method of claim 20, further comprising disposing a secondary bonding layer on a bottom of the recesses, the secondary bonding layer being configured to adhere the attachment portion to the first layer structures, wherein the second layer structure includes at least one securing member formed on an edge region of the attachment portion and configured to secure the attachment portion from moving out of one of the recesses.

22. The method of claim 1, wherein said positioning includes positioning the attachment portion, and wherein the attachment portion is made of a fiber-reinforced thermoplastic material.

23. The method of claim 1, further comprising:
   printing, before said positioning, a ground structure including one or more ground layers; and
   disposing, before said positioning, a secondary bonding layer on the ground structure,
   wherein said positioning includes attaching the attachment portion to the ground structure via the secondary bonding layer.

24. A method for additive manufacturing, comprising:
   positioning an attachment portion in a printer; and printing an object on the attachment portion, the attachment portion being configured to bond to the object at least partially via absorbing heat from the object during said printing, heat from a print substrate of the printer, or a combination thereof, wherein said positioning includes:
  printing a plurality of layers stacked in a stacking direction and collectively forming a closed loop;
  filling space defined by the closed loop with a spray foam configured to expand in the space;
  expanding the spray foam; and
  cutting the expanded spray foam to be even with a top layer of the plurality of layers.

\* \* \* \* \*